US008024506B1

(12) United States Patent
Agesen et al.

(10) Patent No.: US 8,024,506 B1
(45) Date of Patent: *Sep. 20, 2011

(54) MAINTAINING ADDRESS TRANSLATIONS DURING THE SOFTWARE-BASED PROCESSING OF INSTRUCTIONS

(75) Inventors: Ole Agesen, Needham, MA (US); Pratap Subrahmanyam, Sunnyvale, CA (US)

(73) Assignee: VMware, Inc., Palo Alto, CA (US)

(*) Notice: Subject to any disclaimer, the term of this patent is extended or adjusted under 35 U.S.C. 154(b) by 453 days.

This patent is subject to a terminal disclaimer.

(21) Appl. No.: 11/859,710

(22) Filed: Sep. 21, 2007

Related U.S. Application Data

(63) Continuation of application No. 11/323,434, filed on Dec. 30, 2005, now abandoned, which is a continuation of application No. 10/354,556, filed on Jan. 29, 2003, now Pat. No. 7,069,413.

(51) Int. Cl.
G06F 12/00 (2006.01)
G06F 13/00 (2006.01)
G06F 13/28 (2006.01)
G06F 21/00 (2006.01)
G06F 9/26 (2006.01)
G06F 9/34 (2006.01)
G06F 9/46 (2006.01)

(52) U.S. Cl. ............ 711/6; 711/132; 711/205; 711/206; 711/207; 718/104

(58) Field of Classification Search .................. 711/132, 711/205–207; 718/104
See application file for complete search history.

(56) References Cited

U.S. PATENT DOCUMENTS

| 6,205,531 | B1 * | 3/2001 | Hussain | 711/207 |
| 6,760,909 | B1 * | 7/2004 | Draves et al. | 718/102 |
| 2001/0049818 | A1 * | 12/2001 | Banerjia et al. | 717/9 |
| 2002/0065993 | A1 * | 5/2002 | Chauvel | 711/144 |
| 2002/0082824 | A1 * | 6/2002 | Neiger et al. | 704/2 |
| 2002/0144077 | A1 * | 10/2002 | Andersson et al. | 711/203 |

* cited by examiner

Primary Examiner — Yaima Campos
(74) Attorney, Agent, or Firm — Darryl A. Smith

(57) ABSTRACT

The invention is used in a virtual machine monitor for a multiprocessing system that includes a virtual memory system. During a software-based processing of a guest instruction, including translating or interpreting a guest instruction, mappings between virtual addresses and physical addresses are retained in memory until processing of the guest instruction is completed. The retained mappings may be cleared after each guest instruction has been processed, or after multiple guest instructions have been processed. Information may also be stored to indicate that an attempt to map a virtual address to a physical address was not successful. The invention may be extended beyond virtual machine monitors to other systems involving the software-based processing of instructions, and beyond multiprocessing systems to other systems involving concurrent access to virtual memory management data.

25 Claims, 11 Drawing Sheets

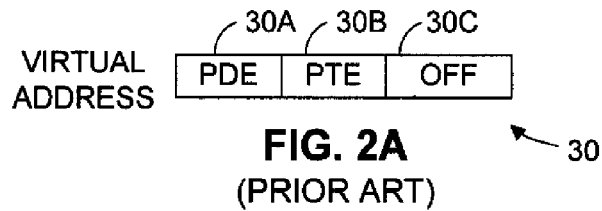
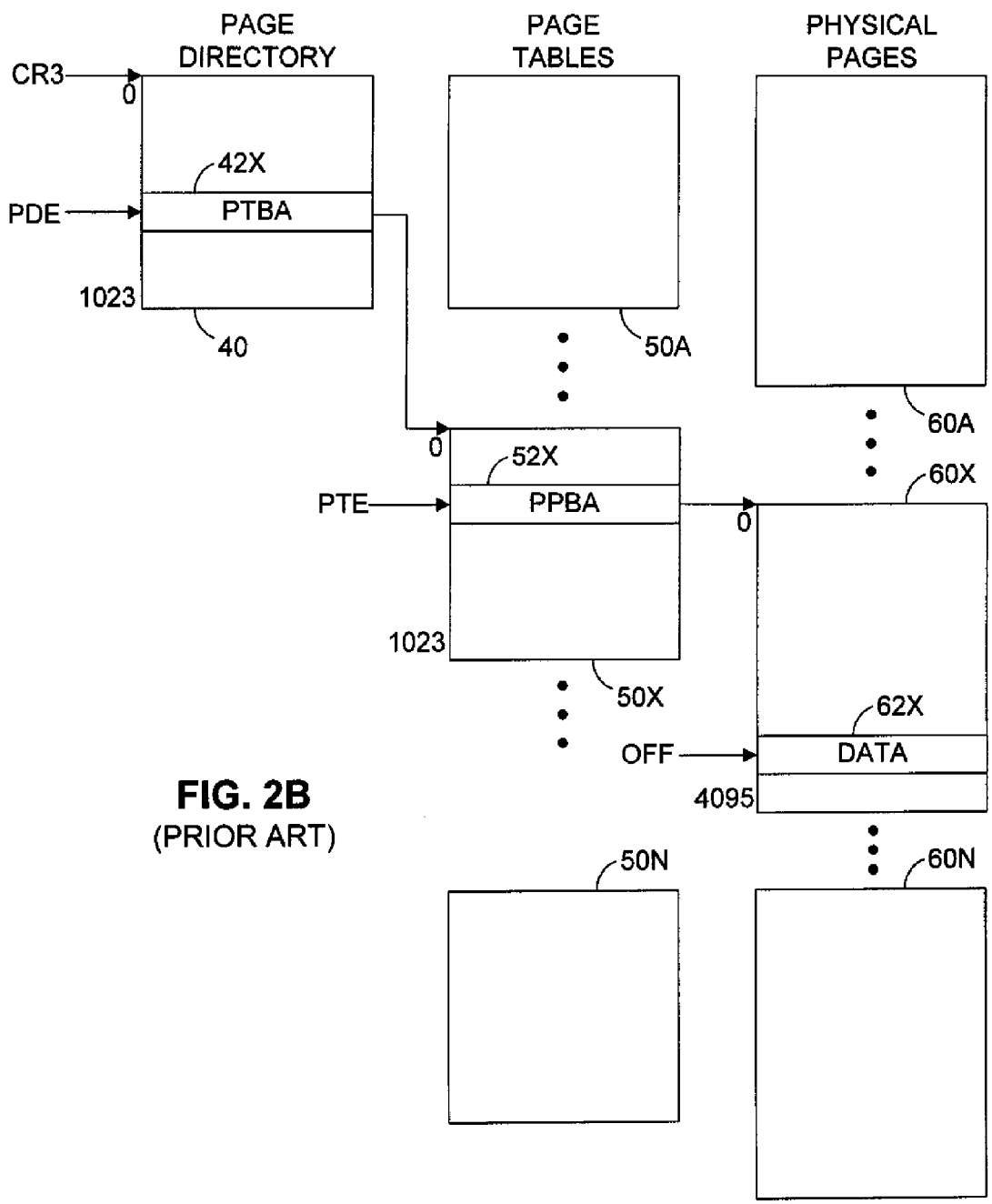
FIG. 2A
(PRIOR ART)
FIG. 2B
(PRIOR ART)

MAINTAINING ADDRESS TRANSLATIONS DURING THE SOFTWARE-BASED PROCESSING OF INSTRUCTIONS

CROSS-REFERENCE TO RELATED APPLICATIONS

This application is a Continuation of pending U.S. patent application Ser. No. 11/323,434, filed 30 Dec. 2005, now abandoned which is a Continuation of U.S. patent application Ser. No. 10/354,556, filed 29 Jan. 2003, which is now issued as U.S. Pat. No. 7,069,413.

BACKGROUND OF THE INVENTION

1. Field of the Invention

This invention relates to computer programs in general, and in particular, to translating virtual addresses to physical addresses during the software-based processing of instructions.

2. Description of the Related Art

Designers and manufacturers of computer systems, central processing units (CPUs) and other hardware and software components of computer systems are continually developing new techniques for better utilizing the resources of a computer system to obtain better overall processing performance. Many of these techniques are well known in the art, such as multiprocessing operating systems, cache memory, virtual memory, direct memory access, multiprocessor systems and hyperthreaded CPUs. There are also many different variations of each of these techniques. Several of these techniques are relevant to this invention, including virtual memory systems, multiprocessor systems and hyperthreaded CPUs.

Virtual Memory Systems

The design and use of virtual memory systems are well known in the art, and there are numerous books and other technical references available on the subject. This invention may be implemented in various different computer systems, using various different virtual memory techniques. For purposes of an example only, the invention will be described in relation to a virtual memory system based on the x86 architecture from Intel Corporation. This architecture is described in the IA-32 Intel Architecture Developer's Manual, a three-volume set, which is currently available on the Internet website of Intel Corporation, and which is hereby incorporated by reference. Volume 3 of that set, the Software Developer's Manual, is particularly informative regarding the virtual memory functions of the architecture.

FIG. 1 is a block diagram of the major functional components of a general virtual memory system in a computer. The system comprises a CPU 10, a memory management unit (MMU) 12, a translation lookaside buffer (TLB) 14, a random access memory (RAM) 16, a plurality of page tables 18, an operating system (OS) 22, a software memory manager (SMM) 24, a hard disk drive 20 and a direct memory access (DMA) controller 21. Each of the functional units illustrated in FIG. 1 may be implemented by conventional components of the well known personal computer (PC) standard architecture. The CPU 10 may also be called a processor. The RAM 16 may also be called a primary memory, while the hard drive 20 may be called a secondary memory. Also, the MMU 12 and the SMM 24 may be considered parts of a more general memory management unit, in which the SMM 24 is the software that controls the hardware MMU 12. The CPU 10 and the MMU 12 may be combined within a single integrated circuit (IC) component, or they may be separate components. Also, the TLB 14 may be contained within the same IC component as the MMU 12, or it may be a separate device.

The most basic function of the CPU 10 is to execute computer programs, including the OS 22. The computer programs are generally stored on the hard drive 20 and loaded into the RAM 16 for execution. The CPU 10 issues memory read commands to retrieve instructions of the computer programs from the RAM 16 and then executes the retrieved instructions. The execution of instructions requires a myriad of other functions too, including reading data from and writing data to the RAM 16. For example, an instruction executed by the CPU 10 may require an operation to be performed on an operand, which may be located in the RAM 16, or the instruction may require that a value be written to a stack, which may also be located within the RAM 16. All information stored in the RAM 16 may be called data, whether the data consists of instructions, operands, stack data or other types of data. At times, however, a distinction may be drawn between different types of data. In addition, the term "computer program" will generally include instructions, operands and the associated stack.

A computer program is loaded from the hard drive 20 into the RAM 16 for execution because fetching information from the RAM 16 is much quicker than from the hard drive 20, which enables the CPU 10 to execute the program much more quickly. Earlier computer systems would load an entire computer program into the RAM 16 for execution, including providing additional RAM required by the program during execution, such as for a data stack. However, RAM is relatively expensive in comparison to the cost of other data storage devices, such as disk drives. As a result, computer systems are often designed with a limited amount of RAM, in comparison to the address space of the system, especially in systems that use 64-bit addressing. This gives rise to various situations in which a computer program requires more memory space than is available in the RAM 16. A simple example of such a situation is when a computer program is simply larger than the RAM 16 of the system on which the program is to run. Another example is in a multiprocessing system, when the sum of the memory required by all of the executing processes and the OS 22 exceeds the amount of RAM 16 in the computer system. Virtual memory techniques may be used to enable the execution of a computer program in such a situation where the RAM 16 that is available for use is less than the total amount of memory required by a computer program.

Virtual memory techniques may be implemented, for example, using a combination of hardware and software. The software portion of such an implementation may be provided by the SMM 24 of the OS 22 of FIG. 1, while much of the hardware functionality may be provided by the MMU 12. The MMU 12 may be included, along with the CPU 10, within a single microprocessor device, such as an Intel Pentium microprocessor, or the MMU 12 may be a separate device. Virtual memory techniques give the appearance, to a computer program, that there is more RAM available than is really the case. The computer program is provided with a virtual address space, which contains all of its instructions, data and stack. The virtual address space is generally larger than the available RAM 16, but the computer program may use the entire virtual address space as if it were all contained in the RAM 16. The virtual address space may have various different types of organization, such as linear or segmented. At any given time, one or more parts of the computer program will be in the RAM 16 while one or more other parts of the computer program will not be in the RAM 16, but will be stored on the hard drive 20. If the computer program attempts to use a part of its address space that is currently not contained in the RAM 16, the SMM 24 will typically transfer the required part of the computer program from the hard drive 20 to the RAM 16.

To implement a virtual memory system, a computer program may be divided into a number of units called pages. For this discussion, assume a 4 kilobyte (Kbyte) page, which is one possible page size in the x86 architecture. Some of the pages of the computer program are loaded into the RAM 16, while others are not, depending on the amount of the RAM 16 that is available to the computer program. Also, the pages that are loaded into the RAM 16 may not be loaded contiguously. Typically, a particular page of the computer program on the hard drive 20 could be loaded into any available page within the RAM 16.

During execution of a computer program, the CPU 10 generates addresses within the virtual address space of the computer program, for reading data from and writing data to the RAM 16. The addresses generated by the CPU 10 may be called virtual addresses or linear addresses. However, the virtual addresses cannot be directly applied to the RAM 16 in a virtual memory system to access the desired memory locations. Instead, the virtual addresses must first be translated into corresponding physical addresses within a physical address space. The physical address space comprises the addresses that are used to access specific memory locations within the RAM 16. The MMU 12 and the SMM 24 have primary responsibility for translating or mapping addresses from the virtual address space to the physical address space. When the CPU 10 attempts to access data from the computer program that resides on a page of the program that is not currently loaded into the RAM 16, the MMU 12 determines that the page is not resident in the RAM 16, a page fault occurs and a trap to the OS 22 ensues. The SMM 24 subsequently transfers the required page from the hard drive 20 into the RAM 16. After the page transfer is complete, execution of the computer program resumes at the same instruction that resulted in the page fault. This time, however, the MMU 12 will determine that the page is loaded into the RAM 16 and the memory access will be completed successfully. If there is not enough available space in the RAM 16 for loading the required page during a page fault, the SMM 24 typically ejects another page from the RAM 16, and the space that the ejected page was occupying is freed up for loading the new page. If the page that is being ejected has been modified in the RAM 16 since it was loaded from the hard drive 20, then it is written back to the hard drive 20 before its memory space is used for the new page.

As described in greater detail below, the MMU 12 initially uses the page tables 18, located within the RAM 16, to translate virtual addresses into physical addresses. In this process, when the MMU 12 receives a virtual address from the CPU 10 for a memory read or write, the MMU 12 must first perform at least one memory read within the page tables 18 just to determine the corresponding physical address. The MMU 12 must then perform another memory access to complete the read or write required by the CPU 10. If the MMU 12 had to access the page tables 18 for every memory access from the CPU 10, using the virtual memory system would add at least one extra memory cycle to each memory access. In some virtual memory systems, multiple memory accesses are required to map a virtual address to a physical address, using the page tables 18. The added memory cycles would slow down the execution of instructions, which would reduce the overall processing power of the computer system. The primary purpose of the TLB 14 is to reduce the number of additional memory accesses that are required to implement the virtual memory system. The TLB 14 is basically a cache for page table entries and typically is located within the MMU 12. Fortunately, when a CPU 10 is executing a computer program, most of its memory accesses will be to a limited number of pages within the RAM 16. At any given time, for a particular program, the CPU 10 will typically access one or a few pages of code, one or a few pages of data and one or a few pages for the stack, depending on the page size used.

At this point, it is useful to discuss page numbers. As described above, the virtual address space of a computer program or a process is divided into a number of pages. As used herein, a process is generally an instance of a computer program. Each of these pages can be numbered consecutively, resulting in virtual page numbers. In the same way, the physical address space of the RAM 16 can be divided into pages as well. These pages can also be numbered consecutively, resulting in physical page numbers. Now, a virtual address can be viewed as specifying a virtual page number in the upper bits and an offset within that page in the lower bits. In the same way, a physical address can be viewed as a physical page number combined with an offset into that physical page. For example, in a system having 32-bit addresses and a 4 Kbyte page size, such as an x86 system, the upper 20 bits of an address can be viewed as a page number and the lower 12 bits can be viewed as an offset within a given page. Then, so long as both virtual pages and physical pages begin at an address that is a multiple of the 4 Kbyte page size, the address translation process can be viewed as converting the upper address bits from a virtual page number to a physical page number, with the lower address bits remaining unchanged as the offset into the respective pages.

The MMU 12 uses the page tables 18 to perform this translation from virtual page numbers to physical page numbers. When the MMU 12 receives a virtual address from the CPU 10, the MMU 12 reads the virtual page number from the upper address bits of the address. The MMU 12 then reads information from the page tables 18 relating to the desired virtual page number. First, the page tables 18 will indicate whether the virtual page number is currently loaded into the RAM 16. If the virtual page is not loaded into the RAM 16, a page fault is generated and the required virtual page is loaded into the RAM 16 as described above. If the virtual page is loaded into the RAM 16, the page tables 18 will also indicate the physical page number that corresponds to the virtual page number. The MMU 12 then uses the retrieved physical page number, along with the offset from the virtual address to access the desired location within the RAM 16. In addition, the MMU 12 writes the virtual page number and the physical page number into an entry in the TLB 14, indicating the mapping between the pages. Accessing the page tables 18 in this manner to determine a mapping from a virtual page number to a physical page number is called walking the page tables 18. Now that the mapping from the virtual page number to the physical page number has been written into the TLB 14, if a subsequent memory access is to the same virtual page number, the MMU 12 can find the appropriate mapping in the TLB 14 within the MMU 12, without having to access the page tables 18 in the RAM 16.

The MMU 12 is designed such that the access to the TLB 14 is much quicker than an access to the page tables 18. The TLB 14 can typically only hold a relatively small number of page mappings, such as 8 to 64 entries, in comparison to the size of the page tables 18. As a result, entries must be evicted from the TLB 14 from time to time. Typically, when the MMU 12 walks the page tables 18 to determine a new mapping, the MMU 12 will evict an existing entry in the TLB 14 to make space to enter the new mapping. Thus, when the MMU 12 receives a virtual address from the CPU 10, the MMU 12 may first access the TLB 14 to determine if the desired mapping is there. If the mapping is not in the TLB 14, then the MMU 12 must perform a page table walk, as described above and in greater detail below.

FIG. 2A shows a 32-bit virtual address 30, comprising a 10-bit page directory entry (PDE) 30A, a 10-bit page table entry (PTE) 30B and a 12-bit offset 30C. FIG. 2B illustrates the structure and operation of the page tables of the x86 architecture, as a more detailed example. FIG. 2B also shows a page directory 40 with 1024 page table base address (PTBA) entries 42, including one specific PTBA entry 42X. FIG. 2B also shows a plurality of page tables 50A, 50X and 50N. These page tables, along with other page tables that are not illustrated, will be collectively referred to as page tables 50. This convention, of using a common numeric portion to refer collectively to all items having alphanumeric references containing the same numeric portion, is used throughout this description. As shown relative to the page table 50X, each of the page tables 50 comprises 1024 physical page base address (PPBA) entries 52. Page table 50X includes one specific PPBA entry 52X. FIG. 2B also shows a plurality of physical pages 60, including the physical pages 60A, 60X and 60N. As shown relative to the physical page 60X, each of the physical pages 60 comprises 4096 addressable bytes 62. Physical page 60X includes one specific byte 62X. Each of the physical pages 60, the page tables 50 and the single page directory 40 reside in the RAM 16. Each of the physical pages 60 includes 4096 bytes, or 4 Kbytes. As described above, the physical pages 60 and the virtual pages of the example in this description include 4 Kbytes of data. Each of the 1024 PTBA entries 42 in the page directory 40 comprises 32 bits, or 4 bytes. Thus, the page directory 40 also constitutes a full 4 Kbyte page in the RAM 16. Each of the 1024 PPBA entries 52 in the page tables 50 also comprises 32 bits. So, each of the page tables 50 also constitutes a full 4 Kbyte page in the RAM 16.

When the MMU 12 receives a virtual address 30 from the CPU 10, the MMU 12 may first check to see if there is an entry in the TLB 14 that provides a mapping from the virtual page number to a corresponding physical page number. The combination of the PDE 30A and the PTE 30B is considered the virtual page number 30AB. In this architecture, the TLB 14 maps 20-bit virtual page numbers to 20-bit physical page numbers. So, the MMU 12 checks whether there is a valid entry in the TLB 14 matching the virtual page number 30AB. If there is, the MMU 12 uses this entry to obtain the desired mapping to a physical page 60. If there is no matching entry in the TLB 14, the MMU 12 must walk the page tables 18. In the x86 architecture, the page directory 40 may be considered a page table 18, as well as the page tables 50. To walk the page tables 18, the MMU 12 first reads a 20-bit value from a control register CR3. This 20-bit value is used as the upper 20 bits of a 32-bit address that points to the base of the page directory 40. The lower 12 bits of this address are set to zero. Thus, the page directory 40 must begin at an address that is a multiple of the 4 Kbyte page size. The page tables 50 and the physical pages 60 must also begin at an address that is a multiple of the 4 Kbyte page size for the same reason. Once the base address of the page directory 40 is determined, the PDE 30A is used as an index into the 1024-entry table of the page directory 40. More specifically, the 20 bits from the control register CR3 are used as the upper address bits, the 10 bits from the PDE 30A are used as the next lower address bits, and the last two address bits are set to 0 to form a memory address, which addresses the PTBA entry 42X. As illustrated in FIG. 2B, the control register CR3 points to the beginning of the page directory 40, while the PDE 30A points to the PTBA entry 42X. One bit of the PTBA entry 42X indicates whether the PTBA entry 42X is a valid entry. If it is not a valid entry, a page fault results, which generally indicates an error condition in the SMM 24. If the entry is valid, a 20-bit value from the PTBA entry 42X is used as the upper bits of a base address for the page table 50X. The PTE 30B is used as an index into the 1024-entry table of the page table 50X. As shown in FIG. 2B, the page table base address entry 42X points to the base of the page table 50X, while the PTE 30B points to the PPBA entry 52X. One bit of the PPBA entry 52X indicates whether the virtual page number 30AB is currently loaded into the RAM 16. If the virtual page number 30AB is not currently loaded into the RAM 16, a page fault results and the required virtual page is loaded into the RAM 16, as described above. If the virtual page number 30AB is loaded into the RAM 16, a 20-bit value from the PPBA entry 52X is used as the upper address bits of a base address for the page table 60X for the current memory access. The offset 30C is now used as an index into the physical page 60X to identify a specific byte address 62X for the memory access. In other words, the 20 bits from the PPBA entry 52X are combined with the 12 bits from the offset 30C to form a 32-bit physical address that is used to perform the memory access requested by the CPU 10. As shown in FIG. 2B, the PPBA entry 52X points to the base of the physical page 60X, while the offset 30C points to the required byte address 62X for the memory access.

Generally, the SMM 24 of the OS 22 is responsible for creating and maintaining the page tables 18 for the use of the MMU 12. The MMU 12 is generally responsible for loading values into the TLB 14 for recently obtained mappings between virtual page numbers and physical page numbers. Values may be flushed from the TLB 14 either by the MMU 12 or by the SMM 24, or possibly by other software within the RAM 16, such as user-level application programs. Each entry within a page table 18 generally contains, in addition to a physical page number, a few other bits for indicating whether the entry is valid, what types of access are allowed for the page, whether the page has been modified and/or referenced since it was loaded into the RAM 16 and whether caching is disabled for the page. An entry within the TLB 14 generally contains a virtual page number and a physical page number, as well as a few additional bits to indicate whether the entry is valid, whether the page has been modified since being loaded into the RAM 16 and what types of access are allowed for the page. When a memory access is performed, if the MMU 12 determines that the virtual page is loaded into the RAM 16, the MMU 12 also accesses these additional bits of the entry within either the page tables 18 or the TLB 14, to determine if the requested memory access is permitted. For example, the access bits may indicate that only read accesses are permitted. If the CPU 10 attempts to write data to such a location, the MMU 12 will generate a page fault.

When a mapping for a particular virtual page number is not contained within the TLB 14 and a page table walk is performed, the MMU 12 typically evicts an entry from the TLB 14 to free up space for a new entry for the current mapping. The virtual page number will be written into the newly available entry in the TLB 14, along with the physical page number that was just determined. The additional bits within the entry of the TLB 14 are typically copied from the corresponding additional bits in the corresponding page table entry. When an entry in the TLB 14 is evicted, a bit indicating whether the page has been modified is typically copied from the entry of the TLB 14 to the corresponding entry in the page table 18. Also, if the SMM 24 removes a virtual page from the RAM 16 for which there is an entry in the TLB 14, the SMM 24 must modify the entry in the TLB 14 to indicate that the mapping is no longer valid. Other programs may also be allowed to indicate that an entry of the TLB 14 is invalid, including possibly user-level applications. The x86 architecture provides an instruction, Invlpg(virtual address), for this purpose. The x86 architecture is defined such that, if an entry in the TLB 14 is set as invalid, the MMU 12 will walk the page tables to determine a mapping for the virtual address. However, if an entry in the TLB 14 is not set as invalid, the MMU 12 may use the TLB 14 to obtain a mapping, or the MMU 12 may walk the page tables to determine the mapping. The x86 architecture also provides an instruction for flushing the entire contents of the TLB 14. As described above, entries within the TLB 14 may also be evicted by the MMU 12 to free up space for a new mapping for a new virtual address. Thus, an entry in the TLB 14 may be created for a specific virtual page number in response to a first access to that virtual page. During a subsequent access to the same virtual page, if the entry in the TLB 14 has been evicted by the MMU 12 in between the two accesses, a page table walk will nonetheless be required. This situation is described as a leakage of the TLB 14.

Multiprocessor Systems and Hyperthreaded CPUs

Another technique that can lead to better performance from a computer system, and that is relevant to this invention, involves combining multiple CPUs within a single computer system to form a multiprocessor system. Multiprocessor systems are also well known in the art and there are various architectures currently available. FIG. 3 illustrates one general architecture for a multiprocessor system. FIG. 3 shows a shared primary memory 16B, an OS 22B, an SMM 24B, a plurality of page tables 18B, and a shared secondary memory 20B. These functional units perform the same basic functions as the corresponding functional units shown in FIG. 1, but they may need to be modified to perform these functions in a multiprocessor environment. There are various types of operating systems 22B for use in multiprocessor systems. Some multiprocessor operating systems 22B use a single operating system image to manage the entire set of processors in concert. In other multiprocessor systems, the system hardware provides a physical partitioning of the system, allowing a different instance of a multiprocessor operating system 22B to manage each partition. In the case of a multiprocessor OS 22B comprising a separate instance for each CPU, the separate instances of the OS 22B may be executed in separate private memories associated with each of the multiple CPUs. The shared primary memory 16B may be the same as the RAM 16, except perhaps larger, and the shared secondary memory 20B may be the same as the hard drive 20, except perhaps larger. The page tables 18B may be the same as the page tables 18, except that there may be more sets of page tables 18B because of the multiple CPUs.

FIG. 3 also shows a first processor (such as a microprocessor) 9A, having a first CPU 11A, a first MMU 13A and a first TLB 15A. The microprocessor 9A is also connected to a first private memory 17A. FIG. 3 also shows a second processor (such as a microprocessor) 9B, having a second CPU 11B, a second MMU 13B and a second TLB 15B. The microprocessor 9B is also connected to a second private memory 17B. The multiprocessor system of FIG. 3 may also have additional microprocessors 9 and associated private memories 17. The microprocessors 9 may be, for example, based on the x86 architecture. In addition, each of the private memories 17 is optional.

In a single-processor system, there may be a single set of page tables 18 or there may be multiple sets of page tables 18. Each process could have its own set of page tables 18 or there could be some sharing of page tables 18. In a multiprocessor system, there could be page tables 18B in the shared primary memory 16B, in one or more of the private memories 17, or both, and any of these page tables 18B could be shared between multiple processes or exclusive to a single process. As another alternative to the system illustrated in FIG. 3, one or more TLBs 15 could be shared among multiple CPUs 11. One example of a multiprocessor system having a shared TLB 15 is illustrated in FIG. 4 and described below.

The virtual memory system implemented in the system of FIG. 3 can be functionally similar to the virtual memory system described above in connection with FIGS. 1 and 2. More specifically, the TLBs 15 and the page tables 18B can have the same basic structure and functionality as the TLB 14 and the page tables 18, respectively, and the MMUs 13 and the SMM 24B can control and use the TLBs 15 and the page tables 18B in the same general manner that the MMU 12 and the SMM 24 control and use the TLB 14 and the page tables 18. If there is no sharing of the TLBs 15 or the page tables 18B between multiple CPUs 11, then the virtual memory system of FIG. 3 can be functionally the same as the virtual memory system of FIGS. 1 and 2, but with a separate instance of the virtual memory system for each of the CPUs 11. However, if there is any sharing of the TLBs 15 or the page tables 18B between the multiple CPUs 11, the virtual memory system gets more complicated. The following discussion will focus on a multiprocessor system containing only two CPUs 11, for simplicity, although it also applies to systems with more CPUs 11.

The discussion also applies to systems that have only one physical CPU, if the CPU implements hyperthreading techniques. Hyperthreading techniques are known in the art and are becoming more prevalent, especially in high-performance CPUs, such as the Xeon microprocessor from Intel Corporation. In a CPU that implements hyperthreading, multiple instruction streams are executed simultaneously. With multiprogramming or multithreading techniques, in contrast, different instruction streams are executed during separate time slices. A CPU that does not provide hyperthreading can generally be modeled as an interpreter loop, in which the CPU repeatedly fetches an instruction, fetches any required operands, performs an operation and does something with the result of the operation, such as writing the result to memory, before moving on to fetch the next instruction. A hyperthreaded CPU, in contrast, can be modeled as multiple independent interpreter loops running concurrently. Effectively, the single physical CPU core provides the capabilities of multiple logical CPUs. However, a hyperthreaded processor typically only has a single TLB, although multiple TLBs are also possible. For the purposes of this invention and the discussion below, a hyperthreaded processor, having multiple logical CPUs but only one TLB, is functionally equivalent to a multiprocessor system having multiple physical CPUs and a single, shared TLB. This invention and the following discussion may apply to any computer system in which multiple processes are executing simultaneously on multiple physical or logical CPUs, and the multiple processes share a common TLB or page table. In fact, as will become apparent below, this invention may even apply in a system having a separate TLB and a separate set of page tables for each process, if one process has write access to the page tables of another process, even if such access is provided inadvertently due to a system software error, for example.

FIG. 4 illustrates another example architecture for a multiprocessor computer system that is relevant to the invention and the following discussion. Specifically, FIG. 4 shows a first CPU 11C, a second CPU 11D, an MMU 13C, a shared TLB 15C, a shared primary memory 16C, an OS 22C, an SMM 24C, a set of page tables 18C, and a shared secondary memory 20C. Each of the CPUs 11C and 11D may be either physical or logical, and there may also be additional physical and/or logical CPUs 11. The MMU 13C and the TLB 15C are shared between the CPUs 11C and 11D. Otherwise, the functional units illustrated in FIG. 4 may be equivalent to the corresponding functional units illustrated in FIG. 3.

Referring again to the multiprocessor system of FIG. 3, suppose that the CPU 11A is executing a first process and the CPU 11B is executing a second process. The system of FIG. 3 implements a virtual memory system, with some pages of the virtual address space of the first process loaded into primary memory 16B and others remaining in the secondary memory 20B. Suppose, for the moment, that the first and second processes share a common set of page tables 18B. The page tables 18B indicate, for each virtual page, whether it is loaded into the primary memory 16B or whether it remains in the secondary memory 20B. The page tables 18B also indicate, for each virtual page loaded into the primary memory 16B, the corresponding physical page number into which the virtual page is loaded. The TLB 15A may also contain one or more entries indicating mappings between virtual pages and physical pages of the primary memory 16B.

Suppose further that the first process executes a first instruction that accesses a first memory location on a first virtual page that is currently loaded into a first physical page. Suppose that the MMU 13A walks the page tables 18B to determine a mapping between the first virtual page and the first physical page, and stores this mapping in the TLB 15A. Now suppose that the second process changes the page tables 18B, or performs some action that causes the page tables 18B to be changed. For example, the second process may attempt to access a second virtual page that is not currently loaded into the primary memory 16B, causing a page fault. In response to the page fault, the SMM 24B loads the second virtual page from the secondary memory 20B into the primary memory 16B. Suppose that the SMM 24B loads the second virtual page from the secondary memory 20B into the first physical page of the primary memory 16B, replacing the first virtual page. The SMM 24B updates the page tables 18B to indicate that the second virtual page is now loaded into the primary memory 16B and is mapped to the first physical page, and to indicate that the first virtual page is no longer loaded into the primary memory 16B.

Now suppose that the first process executes a second instruction that again accesses the first memory location on the first virtual page, or some other memory location on the first virtual page. If the MMU 13A accesses the TLB 15A to determine a mapping for the first virtual page, the previously stored mapping will indicate that the first virtual page is mapped to the first physical page. The MMU 13A would then retrieve the contents of the corresponding memory location within the first physical page and provide this data to the CPU 11A for executing the second instruction. However, the data retrieved by the MMU 13A is actually from the second virtual page, instead of from the first virtual page as intended by the first process. Thus, the CPU 11A would execute the second instruction based on incorrect data, possibly corrupting the data for the first process, the second process, or both. If the first virtual page contained code for the first process, as opposed to operand data or stack data, so that the attempted memory access were an instruction fetch, then the CPU 11A would attempt to execute whatever data is retrieved by the MMU 13A. If the second virtual page happens to contain operand or stack data, then the CPU 11A would nonetheless attempt to interpret the returned data as an instruction and try to execute the interpreted instruction. This situation would also likely lead to corrupted data, or worse.

Multiprocessor systems generally provide methods to try to avoid situations like these. One common technique would enable the second process to cause the mapping between the first virtual page and the first physical page in the TLB 15A to be flushed, such as by a message between the CPU 11B and the CPU 11A. In this case, when the second instruction is executed by the CPU 11A, causing the second access to the first memory location, the MMU 13A would not find a mapping for the first virtual page in the TLB 15A and would be forced to walk the page tables 18B. The MMU 13A would then determine that the first virtual page is no longer loaded into the primary memory 16B, as appropriate.

Various other conflicts in the virtual memory system of FIG. 3 could also arise. For example, suppose that the page tables 18B for the second process are separate from the page tables 18B for the first process. However, suppose further that the second process begins to write data to a physical page of the shared primary memory 16B containing the page tables 18B of the first process, as if the physical page contained operand data of the second process. Generally, such a situation should not arise. However, various conditions in either the hardware or the software of the multiprocessor system could cause just such a situation to arise, such as a defective cell in a memory component or an error in a computer program. This situation, where the second process is writing operand data into the page tables 18B of the first process, could cause various problems for the first process. The first process could read its page tables 18B and conclude that a virtual page has not been loaded into the primary memory 16B when it has, that a virtual page has been loaded into the primary memory 16B when it hasn't, or that a virtual page maps to an incorrect physical page. Again, multiprocessor systems generally provide safeguards to try to avoid situations like these.

Referring now to the multiprocessor system of FIG. 4, suppose that the CPU 11C is executing a first process and the CPU 11D is executing a second process. The first and second processes may share common page tables 18C, or they may have separate page tables 18C. Regardless, the first and second processes share the same TLB 15C. Suppose again that the first process executes a first instruction that accesses a first memory location on a first virtual page that is currently loaded into a first physical page. Suppose that the MMU 13C walks the page tables 18C to determine a mapping between the first virtual page and the first physical page, and stores this mapping in the TLB 15C.

Now the second process may be able to flush this mapping from the TLB 15C at any time. If the mapping were flushed from the TLB 15C and the first process needed to subsequently access the first virtual page again, the first process would have to walk the page tables 18C again to determine the required mapping. So long as the page tables 18C have not been changed, however, the same mapping will be determined and no harm will be done, except that the mapping would take longer to establish.

Suppose, however, that the second process does not flush the mapping from the TLB 15C. Suppose, instead, that the second process changes the page tables 18C of the first process, or performs some action that causes the page tables 18C of the first process to be changed, whether the page tables 18C are shared or not. This situation is similar to the situation described above in connection with the system of FIG. 3, and the same types of virtual memory conflicts could arise. Similar safeguards are also typically implemented to try to avoid such conflicts.

The technical literature currently available describes these types of potential conflicts in virtual memory systems, as well as numerous others. Such conflicts can arise in multiprocessor systems, or in single-processor systems using a hyper-threaded CPU, involving shared TLBs, shared page tables, or even just shared primary memory. Multiprocessor systems are generally designed using various safeguards to try to avoid such conflicts.

Virtual Machine Monitors

A virtual machine monitor (VMM) is a piece of software that runs directly on top of the hardware of a computer system having a first hardware platform and creates an abstracted or virtualized computer system having a second hardware platform. The second hardware platform, or virtualized platform, may be the same as, similar to, or substantially different from, the first hardware platform. The VMM exports all of the features of the virtualized platform, to create a virtual machine (VM) that is functionally equivalent to an actual hardware system implementing the second hardware platform. The VMM generally performs all of the functions that would be performed by a physical implementation of the virtualized hardware platform, to achieve the same results. For example, a VMM generally implements a virtual memory system that is functionally equivalent to the virtual memory system that would result from a physical implementation of the virtualized platform. Various designs for such VMMs are well known in the art.

An OS designed to run on a computer system having the virtualized hardware platform can be loaded on top of the VMM, and the OS should not be able to determine that it is not running directly on an actual hardware system implementing the virtualized hardware platform. Therefore, in the case where the virtualized hardware platform is the same as the physical hardware platform, the OS can be loaded directly onto the actual computer system or on top of the VMM, and the OS would not be able to determine whether the machine on which it is running is the physical machine or the virtual machine. Drivers and other system software that are designed for computer systems having the virtualized hardware platform can also be loaded onto the VMM. An OS running on a VMM, along with drivers and other system software, is called a guest OS. In addition, application programs that are designed to operate on the guest OS may also be loaded onto the VMM. An application program loaded onto the VMM is called a guest application. As one example of a VMM implementation, a VMM may run on an x86 computer system, and it may virtualize an x86 system. In this case, the VMM creates a VM that is compatible with the x86 architecture. Any operating system that can run on an x86 system may be loaded on top of the VMM. For example, a Windows OS from Microsoft Corporation, such as the Windows 2000 OS, may be loaded as the guest OS on top of the VMM. Application programs that are designed to operate on a system running the Windows 2000 OS can then also be loaded onto the VMM. The guest OS and the application programs will execute just as if they were loaded directly onto the underlying physical x86 system.

VMMs cause the instructions that constitute the guest OS and the guest applications to be executed just as they would be on an actual hardware implementation of the virtualized hardware platform. In some situations, such instructions, which are called guest instructions, may be executed directly on the underlying hardware. This type of execution is called direct execution. In other situations, however, direct execution is not possible or desirable, and the guest instructions must be at least partially processed by software. In this patent, a phrase "software-based processing of an instruction" is given a particular definition. In the "software-based processing of an instruction," software performs at least one step or action that is directly involved in the execution of the instruction during the virtualization of a hardware platform, instead of hardware performing all of the actions involved in the execution of the instruction. For example, software may perform one or more of the following actions: fetching the instruction, decoding the instruction, fetching operands, producing an appropriate outcome for the execution of the instruction, or translating the instruction into one or more target instructions that are ultimately to be executed by the hardware. Other phrases that are similar to the "software-based processing of an instruction" will have correspondingly similar definitions for purposes of this patent. One type of software-based processing of instructions is called emulation or interpretation. Interpretation involves executing instructions, one by one, in software. A guest instruction is fetched and decoded, any required operands are fetched and the software performs whatever actions are necessary to achieve the same outcome as the instruction would have achieved had it been executed in hardware. After one instruction is executed, the next instruction is fetched for execution, and so on.

Another type of software-based processing of instructions is called binary translation. With binary translation, one or more guest instructions are converted into target instructions, which can be executed by the hardware. The target instructions are usually analyzed and optimized, and then stored for future execution. When the corresponding guest instructions come up for execution, the execution of the hardware processor branches to the target instructions, and execution proceeds from that point. Many techniques are known to perform binary translation, including optimizing the executable code.

Once the guest instructions have been translated into target instructions, the target instructions can be executed repeatedly, without having to re-translate the same guest instructions each time. Although the combined steps of translating guest instructions and executing the target instructions generally takes longer than interpreting the guest instructions, for a single pass, simply executing the target instructions on subsequent passes is substantially faster than interpreting the guest instructions. In effect, the method of binary translation allows the cost of decoding guest instructions to be amortized over multiple execution passes, which can lead to significant overall performance gains. Thus, the choice between interpreting guest instructions or translating the guest instructions generally involves a tradeoff between the time required for an initial execution and the time required for multiple executions of the guest instructions. Interpretation and translation may also be combined in a single system for the software-based processing of instructions.

VMMs have also been designed to operate on multiprocessor systems, and to virtualize multiprocessor systems. For example, one or more VMMs may execute on the hardware platform illustrated in FIG. 3, and may create a VM having the same hardware architecture. As described above, the VMMs should generally be functionally equivalent to the virtualized hardware platform. Of particular relevance to this invention, the VMMs should generally provide a virtual memory system that is functionally equivalent to the virtual memory system of the virtualized platform. Thus, the VMMs should virtualize one or more MMUs and one or more TLBs that are functionally equivalent to the MMUs and TLBs of an actual physical implementation of the virtualized hardware platform. The virtualized MMUs and TLBs should interact with the SMM of the guest OS and with the guest applications in the same manner as the corresponding physical MMUs and TLBs would interact with the SMM and the guest applications. In particular, the VMMs should provide the same safeguards against virtual memory conflicts, which could result from shared TLBs, shared page tables and/or a shared primary memory, as are provided by a physical implementation of the virtualized platform. For example, suppose a VMM, or a set of VMMs, were designed to virtualize the hardware platform illustrated in FIG. 3, including the function described above in which the second CPU 11B may communicate with the first CPU 11A to cause a mapping in the first TLB 15A to be flushed. Such a VMM would virtualize the first microprocessor 9A, the second microprocessor 9B and the first TLB 15A such that the second virtual CPU could communicate with the first virtual CPU causing the first virtual CPU to flush the mapping in the virtual TLB.

This invention may be used in a virtual memory system of a VMM that virtualizes a multiprocessor hardware platform, where the virtualized hardware platform provides certain safeguards against virtual memory conflicts. The invention may also be used in other computer systems comprising multiple physical or logical processors, and involving software-based instruction processing. As will be described in greater detail below, the software-based processing of instructions, such as by interpretation or translation, may increase the likelihood of virtual memory conflicts, making it more difficult to provide the same safeguards against virtual memory conflicts as are provided by a physical implementation of a hardware platform.

BRIEF SUMMARY OF THE INVENTION

The invention may be implemented in a system having virtual memory capabilities and involving the software-based processing of instructions and concurrent access to virtual memory management data. During the software-based processing of one or more instructions, mappings between virtual addresses and physical addresses are retained until processing of the one or more instructions is completed. In some embodiments of the invention, the retained mappings are cleared after each instruction has been processed. Also in some embodiments of the invention, information is stored to indicate that an attempt to map a virtual address to a physical address was not successful.

The invention may be implemented, for example, in a VMM for a multiprocessing system that includes a virtual memory system. One embodiment of the invention uses a linear data array for storing mappings between virtual addresses and physical addresses. When a guest memory access is attempted during the software-based processing of an instruction, the VMM first checks the data array to determine if there is an entry with a matching virtual address. If there is no entry with a matching virtual address, an attempt is made to establish a mapping in accordance with the virtual memory system, such as through the use of page tables. If a mapping is established, the indicated physical address is used, and the mapping is entered into the data array. If a mapping is not established, an indication is made in the data array of the absence of a mapping for the virtual address. If an entry in the data array does match the virtual address, and the absence of a mapping is not indicated, the indicated physical address is used. If an entry in the data array matches the virtual address, but the entry indicates the absence of a mapping, the attempted memory access is processed without any further attempt at establishing a mapping.

The invention may be implemented in any virtual machine monitor for any multiprocessor system having virtual memory capabilities, including systems in which the architecture of the virtualized hardware platform is different from the architecture of the underlying hardware platform. The invention may also be implemented in other systems that do not include a virtual machine monitor, but that include some other form of software-based instruction processing. Finally, the invention may also be implemented in uniprocessor systems that have multiple logical processors, or that otherwise have multiple logical or physical devices that have concurrent access to virtual memory management data. Also, the method of retaining the mappings and the form of the retained mappings may vary widely.

BRIEF DESCRIPTION OF THE SEVERAL VIEWS OF THE DRAWING

FIG. 2A is a diagram illustrating a virtual address in an x86 architecture.

FIG. 2B is a diagram illustrating the translation of a virtual address to a corresponding physical address in an x86 computer system, using page tables.

DETAILED DESCRIPTION OF THE INVENTION

This invention may be implemented in a VMM for a multiprocessor system implementing a virtual memory system, or in other systems involving multiple logical or physical processors and the software-based processing of instructions. The invention will be described in connection with a VMM for a multiprocessor system. In this example, the system will be a symmetrical multiprocessing (SMP) system and the multiple processors will have the x86 architecture.

Figure 5:
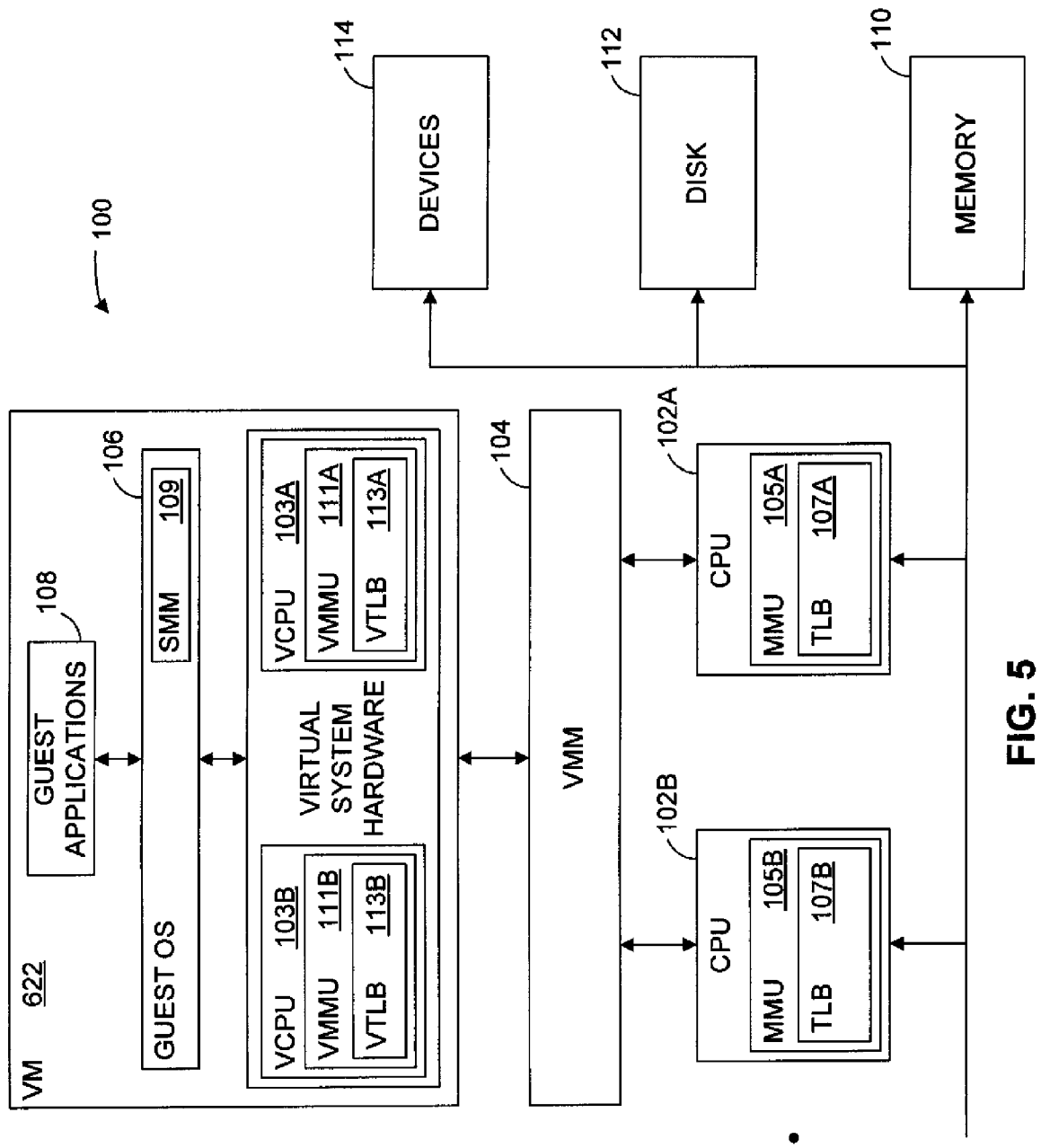
FIG. 5 is a block diagram of the major functional components of a multiprocessor computer system that includes a single VMM for exporting a multiprocessor VM.

FIG. 5 is a functional block diagram of an SMP system 100 that includes a single VMM that exports a multiprocessor VM. The multiprocessor system 100 includes a first microprocessor or CPU 102A, a second microprocessor or CPU 102B, a shared primary memory 110, a shared secondary memory or disk drive 112 and a set of other devices 114, such as a monitor, keyboard, mouse, printer and network interface card. The first microprocessor 102A has a first hardware MMU 105A and a first hardware TLB 107A, while the second microprocessor 102B has a second hardware MMU 105B and a second hardware TLB 107B. A VMM 104 executes on both the first microprocessor 102A and the second microprocessor 102B, and virtualizes an SMP system including a first virtual CPU 103A and a second virtual CPU 103B. The first virtual CPU 103A includes a first virtual MMU 111A and a first virtual TLB 113A, while the second virtual CPU 103B includes a second virtual MMU 111B and a second virtual TLB 113B. The VMM 104 also virtualizes the memory 110, the disk drive 112 and the devices 114. A guest OS 106 runs on top of the VMM 104. The guest OS 106 includes an SMM 109. A set of guest applications 108 runs on top of the guest OS 106 and the VMM 104. The VMM 104, the guest OS 106 and the guest applications 108 are executed out of the shared memory 110.

The first and second microprocessors 102A and 102B have the x86 architecture. For example, recent versions of the Pentium and Xeon microprocessors from Intel Corporation include multiprocessor support features. The first virtual CPU 103A is functionally equivalent to the first processor 102A and the second virtual CPU 103B is functionally equivalent to the second processor 102B, with each virtual CPU 103A and 103B having the x86 architecture. The guest OS 106 may be any multiprocessor OS that is designed to operate on the SMP architecture virtualized by the VMM 104. Several current OSs that are commonly used in uniprocessor computer systems are designed to operate on SMP systems as well. For example, the Windows 2000 OS can operate on an SMP system comprising microprocessors having the x86 architecture. The multiprocessor system 100 may also have additional microprocessors 102, although the following description will focus on a system containing just two microprocessors 102. The VMM 104 would recognize any such additional microprocessors 102 and would export corresponding additional virtual CPUs 103. The guest OS 106 would recognize the number of virtual CPUs 103 in the VM exported by the VMM 104 and adjust accordingly. The guest applications 108 may be standard applications designed to operate on the guest OS 106.

There are various known designs for VMMs that can be used to implement the VMM 104. This invention can be implemented in any of these VMM designs. The products of VMware, Inc., of Palo Alto, Calif., include two distinct VMM designs that can be used to implement the VMM 104, and in which this invention may be implemented. One such design will be used in this example.

Figure 6:
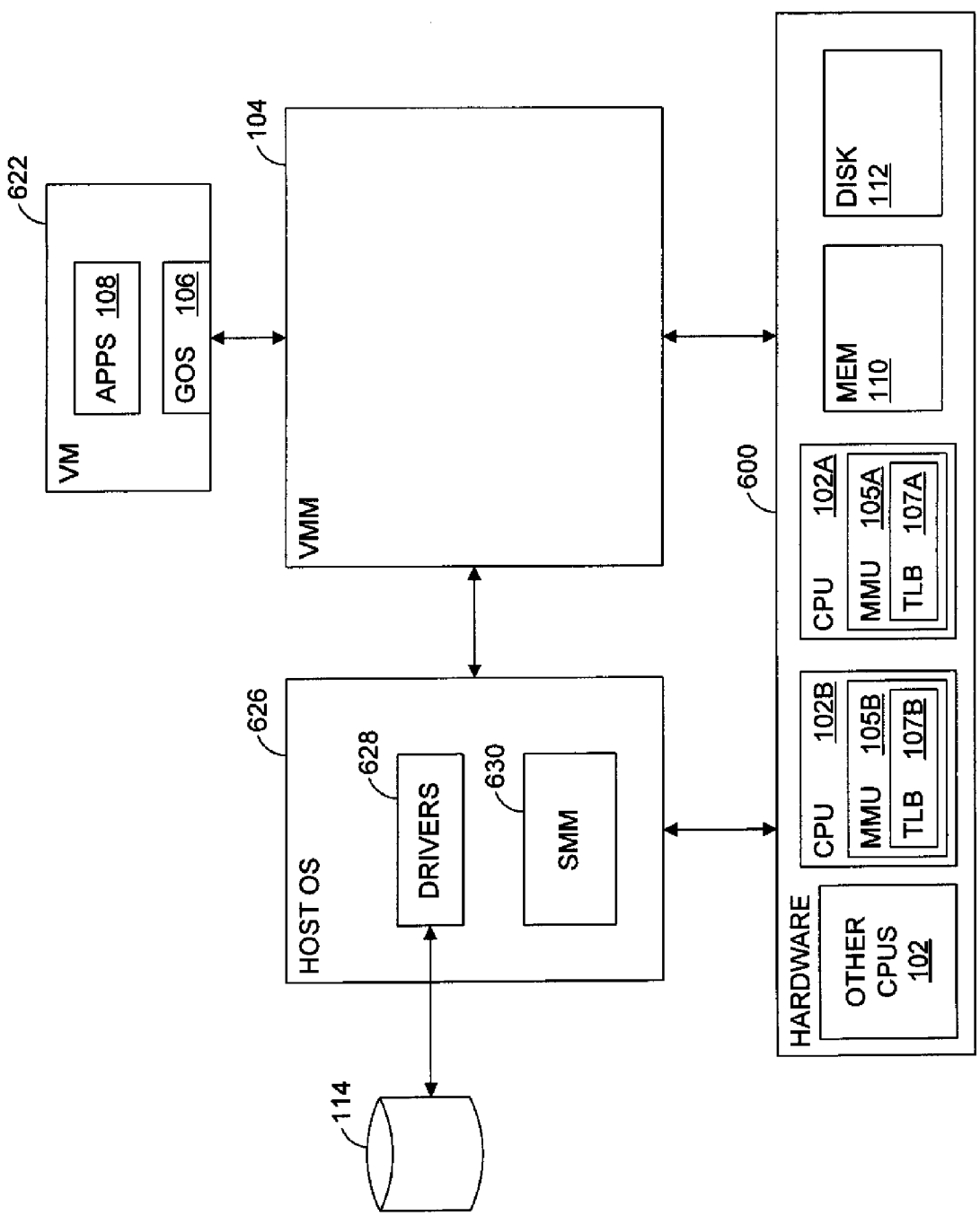
FIG. 6 is a block diagram of a computer system, including a VMM in which this invention may be implemented.

FIG. 6 illustrates a VMM implementation using a Host OS. This invention may be implemented in this VMM implementation. FIG. 6 shows the VMM 104 of FIG. 5, which will be described in greater detail below, in connection with FIG. 7. FIG. 6 also shows a physical computer system 600, comprising the first CPU 102A, the first MMU 105A, the first TLB 107A, the second CPU 102B, the second MMU 105B, the second TLB 107B, the memory 110, the disk drive 112, and the devices 114, which were all illustrated in FIG. 5 and described above. The computer system 600 may also comprise additional CPUs 102, although, again, the following discussion will focus on a system containing just two CPUs 102. FIG. 6 also shows a host OS 626, which includes a set of drivers 628 for the devices 114, as well as an SMM 630. The disk drive 112 is commonly referred to as a "device" also, similar to the devices 114, and the set of drivers 628 typically contains a driver for the disk drive 112 as well. The disk drive 112 is illustrated and described separately from the devices 114 to better illustrate and describe virtual memory systems and this invention. The host OS 626 may be a conventional multiprocessor OS, such as the Windows 2000 OS, including a conventional SMM 630 and conventional drivers 628. The host OS 626 may be loaded onto the hardware 600 in a conventional manner. FIG. 6 also shows a VM 622 executing on top of the VMM 104, including the virtual or guest OS 106 and a set of guest applications 108, which are also illustrated in FIG. 5 and described above. As described above, the VMM 104 exports an SMP multiprocessor hardware platform based on the x86 architecture. The guest OS 106 may be any OS that is designed to operate on such an x86 platform, such as the Windows 2000 OS. The guest OS 106 may be the same as the host OS 626, or it may be different. The guest applications 108 may be any applications that are designed to operate on the guest OS 106 and the virtualized hardware platform.

Figure 7:
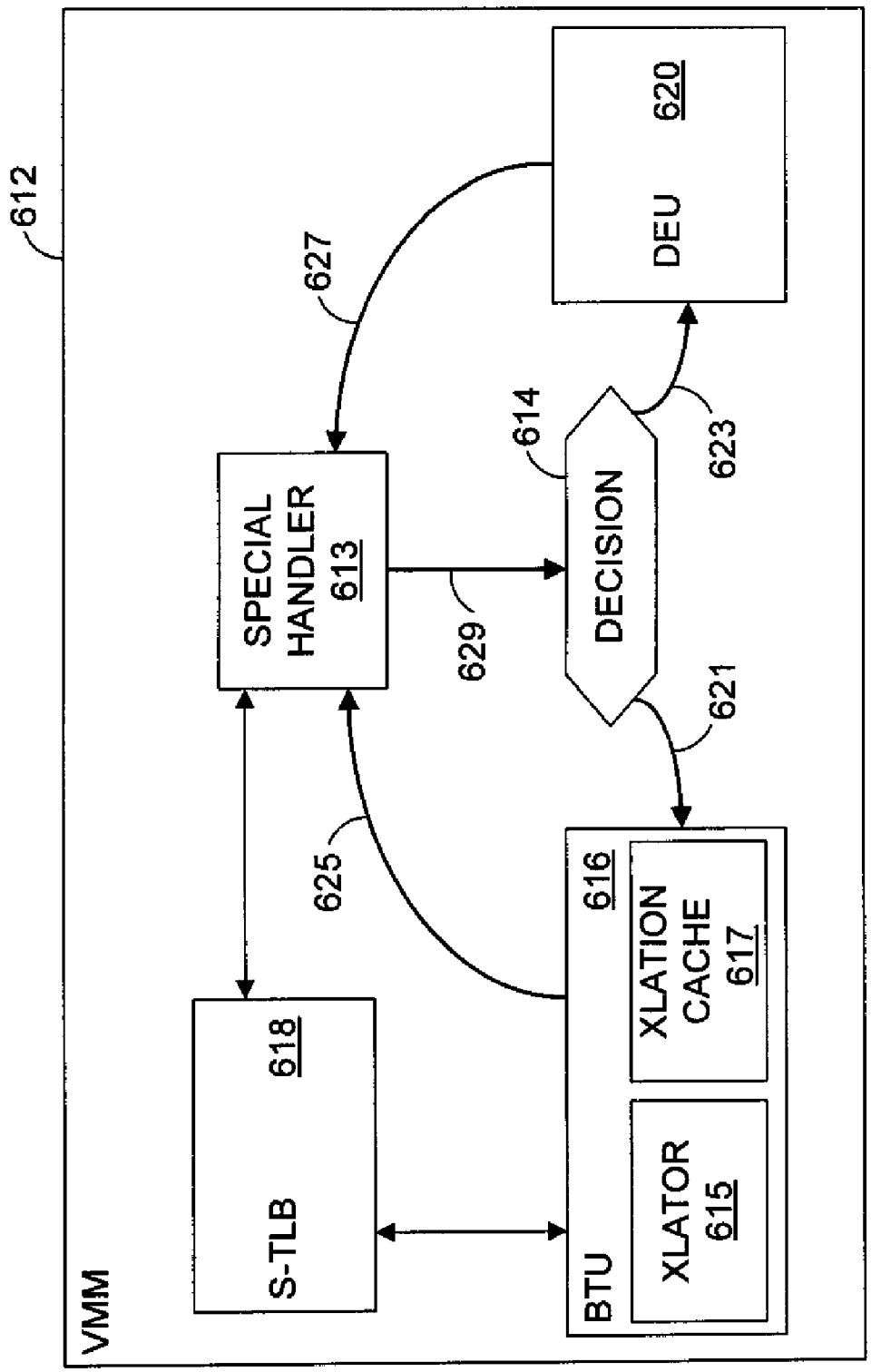
FIG. 7 is a block diagram of the VMM of FIG. 6, including an implementation of this invention.

FIG. 7 shows the structure and operation of the VMM 104 in greater detail. As shown in FIG. 7, the VMM 104 comprises a decision unit 614, a binary translation unit (BTU) 616, a software TLB (S-TLB) 618, a direct execution unit (DEU) 620, and a special handler 613. The BTU 616 further comprises a translator 615 and a translation cache 617.

The VMM 104 has two primary methods for handling guest instructions, a direct execution method, using the DEU 620, and a binary translation method, using the BTU 616. In the direct execution method, guest instructions from the guest OS 106 and the guest applications 108 are executed directly on the underlying hardware 600. In the binary translation method, guest instructions are translated into target instructions, which are then executed on the underlying hardware 600. Various designs are known for both the DEU 620 and the BTU 616, and any of them may be used in this VMM 104. In the system of FIG. 7, the VMM 104 uses the host OS 626, shown in FIG. 6, to perform many conventional OS functions, such as file system management and device interface functions. For example, various functions of the host OS 626 may be called by the VMM 104 during binary translation. However, the VMM 104 only indirectly relies on and accesses the host OS 626 for any host resources, in accordance with the description in U.S. Pat. No. 6,496,847, "System and Method for Virtualizing Computer Systems" ("the '847 patent"). In alternative systems, the OS functions performed by the host OS 626 may be performed directly within the VMM 104 or within a kernel (not shown) that operates between the hardware 600 and the VMM 104.

The VMM 104 controls the execution of instructions by each of the two or more processors 102. Each of the processors 102 may generally be in either direct execution mode or binary translation mode at any given time. The decision unit 614 determines when the DEU 620 is used and when the BTU 616 is used for each processor 102, independently from one another. Thus, the virtualization of each of the microprocessors 102 is effectively handled separately and independently. The VMM 104 may essentially be a combination of multiple uniprocessor VMMs, one for each processor 102, with the addition of some communications between the multiple virtual CPUs 103, and the virtualization of devices that are only relevant in a multiprocessor context, such as an I/O Advanced Programmable Interrupt Controller (I/O APIC). The following discussion will focus on the execution mode of the first processor 102A, although the discussion applies equally well to the execution mode of the other processors 102.

The processor 102A may generally be operating in either the direct execution mode or the binary translation mode. The direct execution mode of the DEU 620 is generally preferred over the binary translation mode of the BTU 616, because it executes the guest instructions more quickly. The DEU 620 may not be used, however, in various situations. For example, the VM 622 is never permitted to operate at the most privileged level of the CPUs 102 to protect the VMM 104 and the host OS 626. If the first processor 102A is operating in direct execution mode and the guest OS 106 requests to operate at the most privileged level on the first processor 102A, the decision unit 614 will generally switch execution over to the BTU 616, although this process is described in greater detail below. At some point, when it is safe to return to direct execution mode, the decision unit 614 switches execution back to the DEU 620. The VMM 104 effectively places a restriction on the privilege level at which guest instructions may be executed. An exception occurs if the execution of a guest instruction would require a more privileged level. The exception is handled by finding some way to achieve the same results as the more privileged instruction(s), without allowing the VM 622 to operate at the more privileged level. Similarly, the VMM 104 places access restrictions on sensitive areas of the memory 110, so that if a guest instruction attempts a memory access that may be unsafe to the VMM 104 or the host OS 626, an exception occurs and execution will again generally switch to the binary translation mode.

Figure 9:
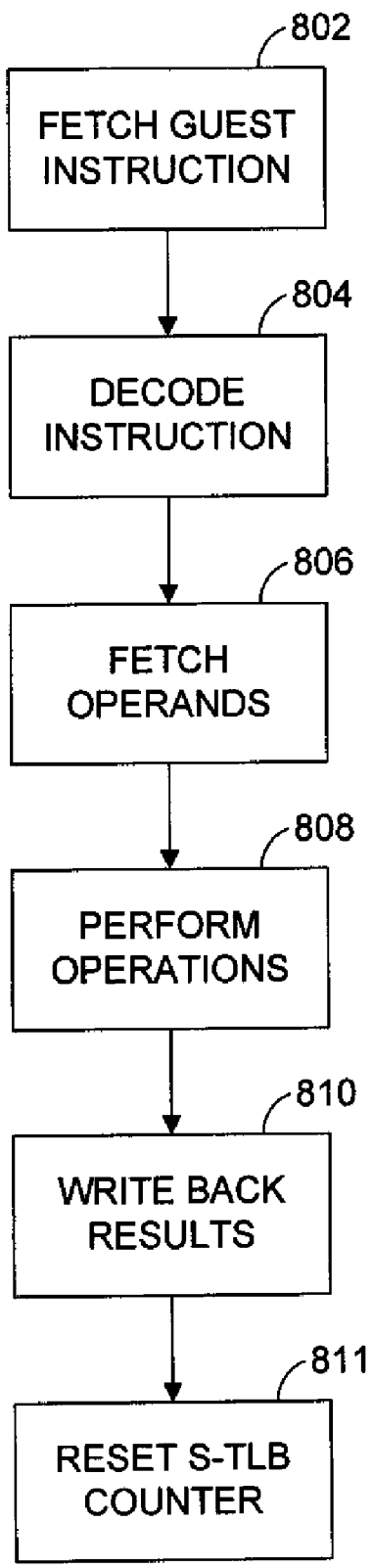
FIG. 9 is a flowchart illustrating a method according to this invention of interpreting and executing a guest instruction.

Suppose that the processor 102A is currently operating in direct execution mode, so that the guest instructions from the guest OS 106 and the guest applications 108 are executed directly on the processor 102A. The processor 102A continues operating in direct execution mode until an exception or interrupt occurs, such as because of a violation of a privilege level restriction, because of a violation of a memory access restriction, or for some other reason. When an exception occurs, execution is switched to the special handler 613, as illustrated by a first execution path 627 in FIG. 7. The special handler 613 is a set of routines that may be written in a high level programming language, such as the C programming language. The special handler 613 interprets the instruction that caused the exception, and effectively executes the instruction in a manner that is safe for the VMM 104 and the host OS 626, but which also accurately implements the VM 622. The special handler 613, which implements this invention, involves software-based instruction processing, specifically software-based interpreting of instructions. The operation of the special handler 613 is illustrated in FIG. 9 and is described in greater detail below. After the special handler 613 completes execution of the instruction that caused the exception, operation for the processor 102A follows a second execution path 629 to the decision unit 614. The decision unit 614 may also be implemented in a high level programming language. The decision unit 614 now decides whether execution can return to the DEU 620, or whether execution must now go to the BTU 616. If execution is returned to the DEU 620, the operation of the first processor 102A follows a third execution path 623. The DEU 620 will again execute guest instructions until another exception or interrupt occurs.

Figure 10:
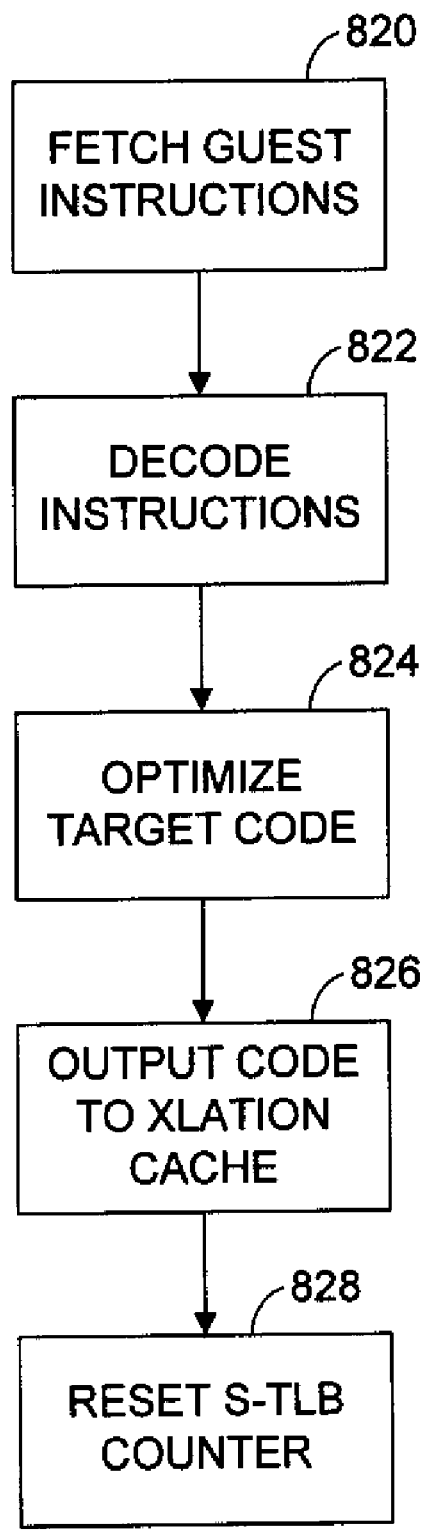
FIG. 10 is a flowchart illustrating a method according to this invention of translating one or more guest instructions into target instructions.

If the decision unit 614 determines that execution should go to the BTU 616, the operation of the first processor 102A follows a fourth execution path 621. The BTU 616 performs two basic functions, the translation of one or more guest instructions into target instructions and the execution of target instructions. The translator 615 fetches guest instructions, translates them into target instructions, optimizes the target instructions and stores them in the translation cache 617 for subsequent execution. The translator 615 is also a set of routines that may be written in a high level programming language, such as the C programming language. When the target instructions are executed by the processor 102A, the overall effect is the same as if the guest instructions had been executed on a physical implementation of the hardware platform virtualized by the VMM 104. The method of the translator 615, which also implements the present invention, is illustrated in FIG. 10 and described below. The method of the translator 615 also involves the software-based processing of instructions, specifically the software-based translation of instructions. The target instructions in the translation cache 617 are executed directly by the processor 102A. When the decision unit 614 switches execution to the BTU 616, the BTU 616 determines whether the translation cache 617 already contains a valid translation of the next guest instruction or instructions. The translation cache 617 is preferably relatively large, so as to avoid translating guest instructions any more than is necessary. If the translation cache 617 does not contain a translation of the next guest instruction(s), the translator 615 translates, or attempts to translate, one or more guest instructions into target instructions and stores the target instructions in the translation cache 617, as described below. After the translator 615 finishes translating a group of one or more guest instructions, the BTU 616 causes the processor 102A to begin executing the target instructions out of the translation cache 617. When executing out of the translation cache 617, the processor 102A may jump to various other locations within the translation cache 617 to execute other software routines that have also already been translated into target instructions.

At some point, the processor 102A may run out of target instructions to execute. In other words, the processor 102A may be executing target instructions that correspond to a set of guest instructions, and the processor 102A may execute the last target instruction, where there are additional guest instructions for which there are no corresponding target instructions. At this point, execution returns to the translator 615, and additional guest instruction(s) are translated and stored in the translation cache 617. Once the translator 615 again finishes translating one or more guest instructions, the BTU 616 again causes the processor 102A to execute the new target instructions in the translation cache 617.

Exceptions occur when the processor 102A is executing instructions out of the translation cache 617, as well. Such exceptions may be for the same reasons as the exceptions in the direct execution mode, namely because of a violation of a privilege level restriction, because of a violation of a memory access restriction, or for some other reason. In response to such an exception, the operation of the VMM 104 will follow a fifth execution path 625 to the special handler 613. The special handler 613 may again execute a single guest instruction in a manner that is safe to the VMM 104 and the host OS 626, while accurately implementing the VM 622. After the execution of the single guest instruction by the special handler 613, operation of the VMM 104 again follows the second execution path 629, and the decision unit 614 again decides whether execution should return to the DEU 620 or the BTU 616.

The VMM 104 is based on the VMMs described in the '847 patent and U.S. Pat. No. 6,397,242, "Virtualization System Including a Virtual Machine Monitor for a Computer with a Segmented Architecture" ("the '242 patent"), which are both incorporated herein by reference. The '847 patent and the '242 patent do not describe the S-TLB 618, however. As described in detail below, the S-TLB 618 is a data structure of this invention that may be used in the implementation of a VMM for a multiprocessing system.

Figure 3:
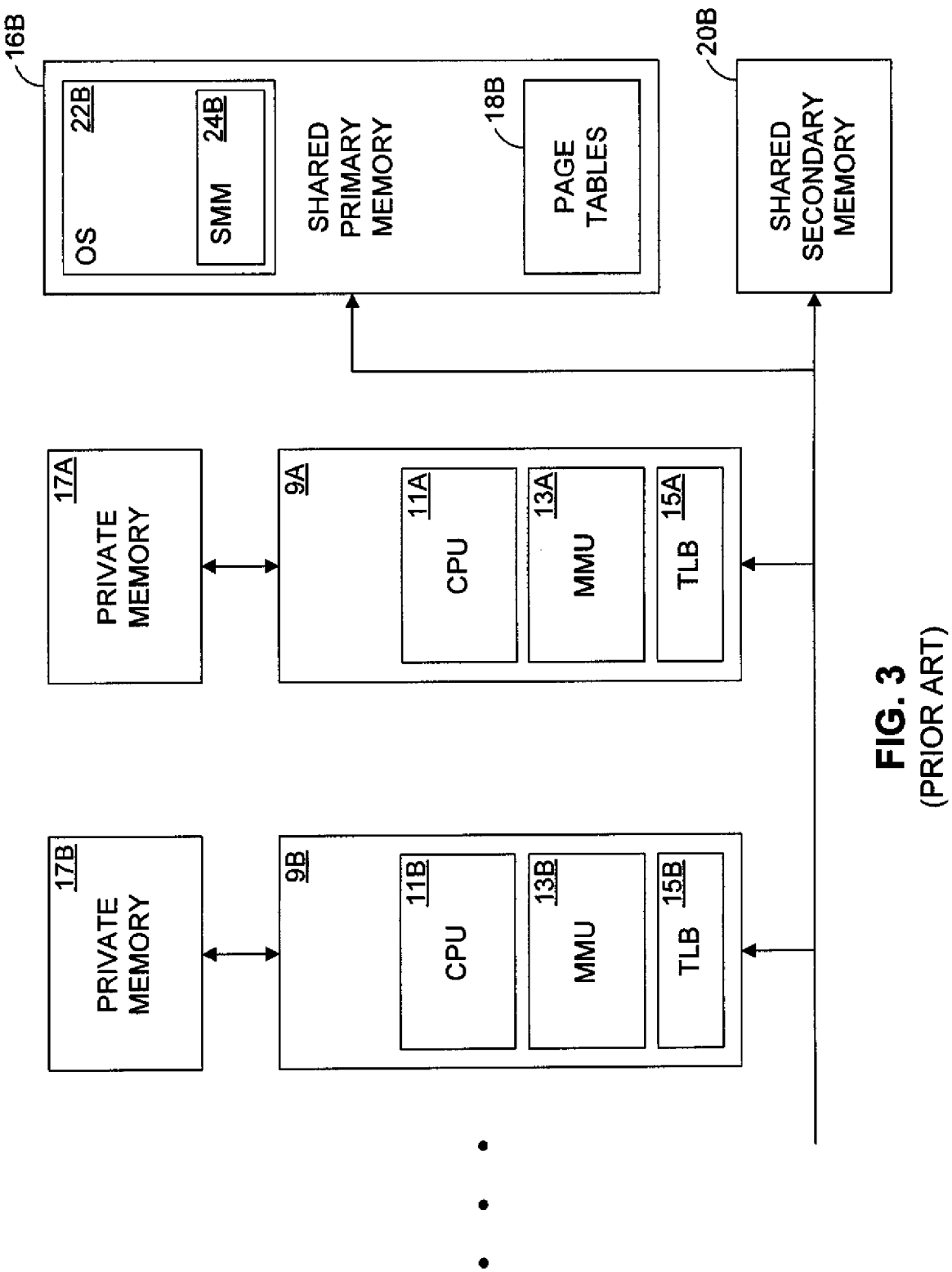
FIG. 3 is a block diagram of the major functional components of a virtual memory system in a first general multiprocessor computer system, involving separate TLBs.
Figure 4:
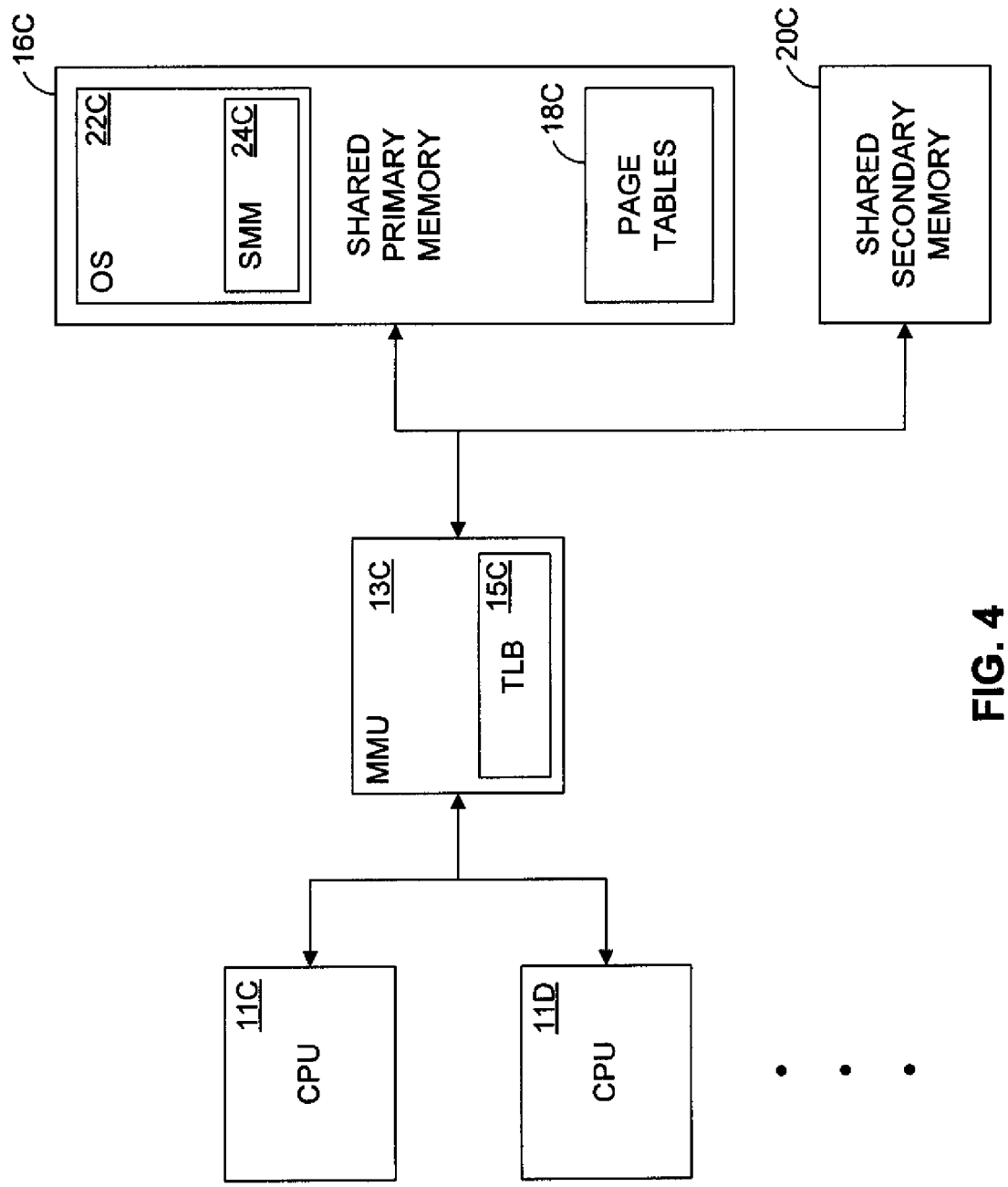
FIG. 4 is a block diagram of the major functional components of a virtual memory system in a second general multiprocessor computer system, involving a shared TLB.

As described above, virtual memory systems for multiprocessing systems often provide safeguards to protect against various virtual memory conflicts that can arise in a multiprocessing environment because of shared TLBs, shared page tables or shared memory. Such safeguards are implemented by the MMUs 13A and 13B and the SMM 24B of FIG. 3, for example. VMMs are generally designed to export a VM that behaves the same way that a physical implementation of the virtualized hardware platform would behave, including providing these safeguards against virtual memory conflicts.

Consider the multiprocessing system 100 of FIG. 5. Again, this discussion will assume just two CPUs 102, although the discussion also applies to multiprocessing systems having more than two CPUs 102. Suppose that a first set of guest instructions, or a first guest routine, is executing on the first virtual CPU 103A and that a second set of guest instructions, or a second guest routine, is executing on the second virtual CPU 103B. Suppose further that the VMM 104 is currently executing both routines in direct execution mode. Now the SMM 109 sets up a set of page tables for the first routine in the VM 622 exported by the VMM 104, mapping virtual pages of the first routine to "physical pages" of the VM 622. However, the physical pages of the VM 622, as seen by the guest OS 106, may not correspond to the physical pages in the actual physical memory 110. Meanwhile, in direct execution mode, the guest instructions from the first routine execute directly on the CPU 102A. The MMU 105A will look to the TLB 107A or to some page tables for the first routine to determine mappings between the virtual pages of the first routine and the physical pages of the physical memory 110. However, the MMU 105A typically cannot refer to the page tables generated by the SMM 109, because they may not be accurate with respect to the physical memory 110. Instead, the VMM 104 must ensure that the page tables seen by the MMU 105A are accurate, mapping the virtual pages of the first routine to the appropriate physical pages in the physical memory 110. In effect, the VMM 104 adds an extra level of address translation to get from a virtual address of a guest application 108 to a physical address of the physical memory 110. Various methods are known to ensure the correct mapping from virtual pages of a guest application 108 to physical pages of the physical memory 110.

Now suppose that a first instruction to be executed in the first routine requires the incrementing of the contents of a first memory location on a first virtual page, corresponding to a first physical page. Performing this first instruction generally requires three distinct tasks, namely retrieving the contents of the first memory location into a register, incrementing the contents of the register and writing the contents of the register back to the first memory location. As is well known, microprocessors generally break machine language instructions down into micro-instructions or micro-ops for execution. In this example of an increment instruction, a microprocessor will generally break the instruction down into three micro-ops, corresponding to the three basic tasks described above. These three micro-ops include two separate memory accesses to the first memory location, first to read and later to write the operand data. Suppose that, before the machine language instruction is executed, there is no mapping in the TLB 107A for the first virtual page. When the CPU 102A executes the first micro-op to retrieve the contents of the first memory location into a register, the MMU 105A walks the page tables specified by the VMM 104 to determine the appropriate mapping between the first virtual page and the first physical page. The MMU 105A then reads the contents of the first memory location into a register, and adds an entry in the TLB 107A specifying the mapping between the first virtual page and the first physical page.

Suppose, however, that this entry in the TLB 107A is lost before the first CPU 102A is able to complete execution of the machine language instruction. For example, the MMU 105A could arbitrarily evict the entry. Now the first CPU 102A executes the second micro-op and increments the value in the register. Then, the first CPU 102A executes the third micro-op and attempts to write the new contents of the register back to the first memory location. The MMU 105A will not find an entry in the TLB 107A for the first virtual page, and will be forced to walk the page tables again. Suppose further, however, that, before the MMU 105A is able to walk the page tables again, the second CPU 102B writes data into the page tables of the first routine, meaning the page tables seen by the MMU 105A, overwriting the data mapping the first virtual page to the first physical page. Now, when the MMU 105A completes the page table walk, a different mapping will be found for the first virtual page. As a result, the first CPU 102A writes the operand data back to a different location from which the data was read. The result of the first machine language instruction is now quite different from what was intended. Instead of incrementing the contents of the first memory location, the contents of the first memory location are incremented, but then stored in a second memory location. This action could corrupt the data of the first routine, the second routine and/or other routines.

This situation is similar to the virtual memory conflicts described above. For a virtual memory system to operate in a predictable manner, the system must provide consistent results each time a memory access is performed. In this case, the inconsistency between multiple memory accesses occurred during the execution of a single machine language instruction within the first CPU 102A. Such an inconsistency will be referred to as an intra-instruction inconsistency. Multiprocessor systems generally provide safeguards against intra-instruction inconsistencies, in addition to the other virtual memory safeguards described above. To prevent the type of inconsistency described above, multiprocessor systems generally ensure that a TLB does not evict or flush any mapping entry that has been created or used during an instruction, until after the execution of that instruction is complete. A TLB with the characteristic of retaining mapping entries throughout the execution of an instruction will be referred to as a firm TLB. A TLB that does not have this characteristic will be referred to as a loose TLB. All commonly deployed multiprocessor systems available today provide firm TLB semantics.

As described above, VMMs are generally designed to provide the same results as would be obtained by a physical implementation of the virtualized hardware platform. Thus, a VMM that virtualizes a hardware platform that provides firm TLB semantics should preferably also provide firm TLB semantics. Returning to the example described above, when the VMM 104 is executing the first routine in direct execution mode, guest instructions are executed directly on the underlying hardware, and the underlying hardware provides the firm TLB semantics. So, in the example above, the CPU 102A would not allow the mapping between the first virtual page and the first physical page to be evicted or flushed from the TLB 107A until the execution of the first instruction is completed, avoiding the intra-instruction inconsistency described above.

Now suppose the same scenario as described above, except that the VMM 104 is now executing the first routine in binary translation mode. The second routine could still be executing in direct execution mode, however. Now, a single guest instruction may be translated into a single target instruction, or into multiple target instructions, including possibly many target instructions. Suppose that a second guest instruction is translated into a set of target instructions, where multiple instructions from the set access the first memory location described above. Suppose next that the first CPU 102A executes this set of target instructions out of the translation cache 617. In between the multiple instructions that access the first memory location, the second CPU 102B could again write to the page tables of the first routine, causing a similar virtual memory conflict. However, in this case, the two accesses to the first memory location do not occur within the same target instruction, even though they derive from the same guest instruction. In binary translation mode, the target instructions are executed directly on the underlying hardware. The TLB 107A will provide firm TLB semantics with respect to a single target instruction, but not with respect to a single guest instruction, when the translation of the guest instruction leads to multiple target instructions. If the VMM 104 is to export a VM 622 that is functionally the same as the virtualized hardware platform, then the VMM 104 must provide the characteristics of a firm TLB. In direct execution mode, the TLBs 107A and 107B of the underlying hardware provide the firm TLB semantics for the VM 622. In binary translation mode, the TLBs 107A and 107B also provide firm TLB semantics for the VM 622 when a guest instruction is translated into a single target instruction, but not necessarily when a single guest instruction is translated into multiple target instructions. Thus, in this case, the VMM 104 must provide firm TLB semantics in some other manner.

The translator 615 may generally translate guest instructions in a manner that provides firm TLB semantics when the target instructions are executed. For example, when a guest instruction reads a value from a virtual address in guest memory one time, the resulting target instructions should generally only read from that virtual address once also because, in a concurrent programming environment, multiple reads from the same virtual address can yield multiple results, which, if acted upon, will generally cause the target instructions to generate different results from the results that would be generated by the guest instruction.

Multiple reads from the same virtual address can yield multiple results for two distinct reasons. First, as in the example described above, a mapping for the virtual address may change between the two reads, causing each read to access a different physical memory address, giving rise to a "mapping inconsistency." Second, although the mapping may remain consistent between the two reads, so that the same physical memory location is accessed each time, the contents of that memory location may change in between the two reads, giving rise to a "data inconsistency." Providing firm TLB semantics relates primarily to mapping consistency, although data consistency is also important in implementing a VMM.

Generally, to provide firm TLB semantics, once a set of target instructions reads a value from guest memory, the value should be retained until it is no longer needed in the translation of the guest instruction. More generally, the number of guest memory accesses, the type of guest memory accesses and the order of the guest memory accesses should match between the guest instructions and the set of target instructions. Each operand in the guest instruction should be used only once in the target instructions. The translation of guest instructions in this manner, to achieve firm TLB semantics, will vary for different instructions, and in different situations. However, a person of skill in the art of concurrent programming will understand how to achieve this objective for most, if not all guest instructions.

The most difficult type of guest instruction for which to achieve this result is an instruction that reads a value from a location in guest memory, performs some function on the obtained value, and writes the result back to the same location in guest memory. An example of such an instruction is the increment instruction described above. This type of guest instruction may nonetheless generally be translated in a manner that achieves results that are consistent with providing firm TLB semantics. For example, target instructions may be generated that form a loop. First, within this loop, a value is read from guest memory using the virtual address from the guest instruction, and the value is placed into a first register. Next, the function of the guest instruction is performed on the value in the first register, but the result is written into a second register. Next, a compare and swap instruction is performed, that retrieves a value from guest memory using the same virtual address from the guest instruction, compares the retrieved value with the contents of the first register and, if the compare determines that the retrieved value and the register contents are the same, the contents of the second register are written back to guest memory using the virtual address again. For example, the x86 architecture includes an instruction, CMPXCHG, that performs this compare and swap function. The target instruction loop is executed repeatedly, until the compare and swap function successfully writes a value to guest memory. Using this technique, the mapping for the virtual address may change between the initial read and the write, or the contents of the addressed memory location may change, but when the write is ultimately performed, the compare and swap instruction and the firm TLB semantics of the underlying hardware ensure that the memory location to which the write is addressed receives the value that would have resulted from the execution of the guest instruction. The ultimate result is the same as if the single guest instruction had been executed at the time that the compare and swap instruction successfully wrote a value to guest memory. As far as the guest OS and applications can determine, the VM has firm TLB semantics.

Another way to provide firm TLB semantics in the VMM 104 is to interpret a guest instruction using the method of FIG. 9, including the use of the S-TLB 618 of this invention. In the embodiment illustrated in FIG. 7, the special handler 613 interprets guest instructions according to this method. As described above, execution switches to the special handler 613 whenever an exception occurs when executing in either direct execution mode or binary translation mode. Execution may also be switched to the special handler 613 if, for any reason, the translator 615 is not able to translate a guest instruction into a set of target instructions that provides firm TLB semantics. In this case, the special handler 613 will provide firm TLB semantics for the guest instruction by interpreting the instruction according to the method of FIG. 9.

Figure 8:
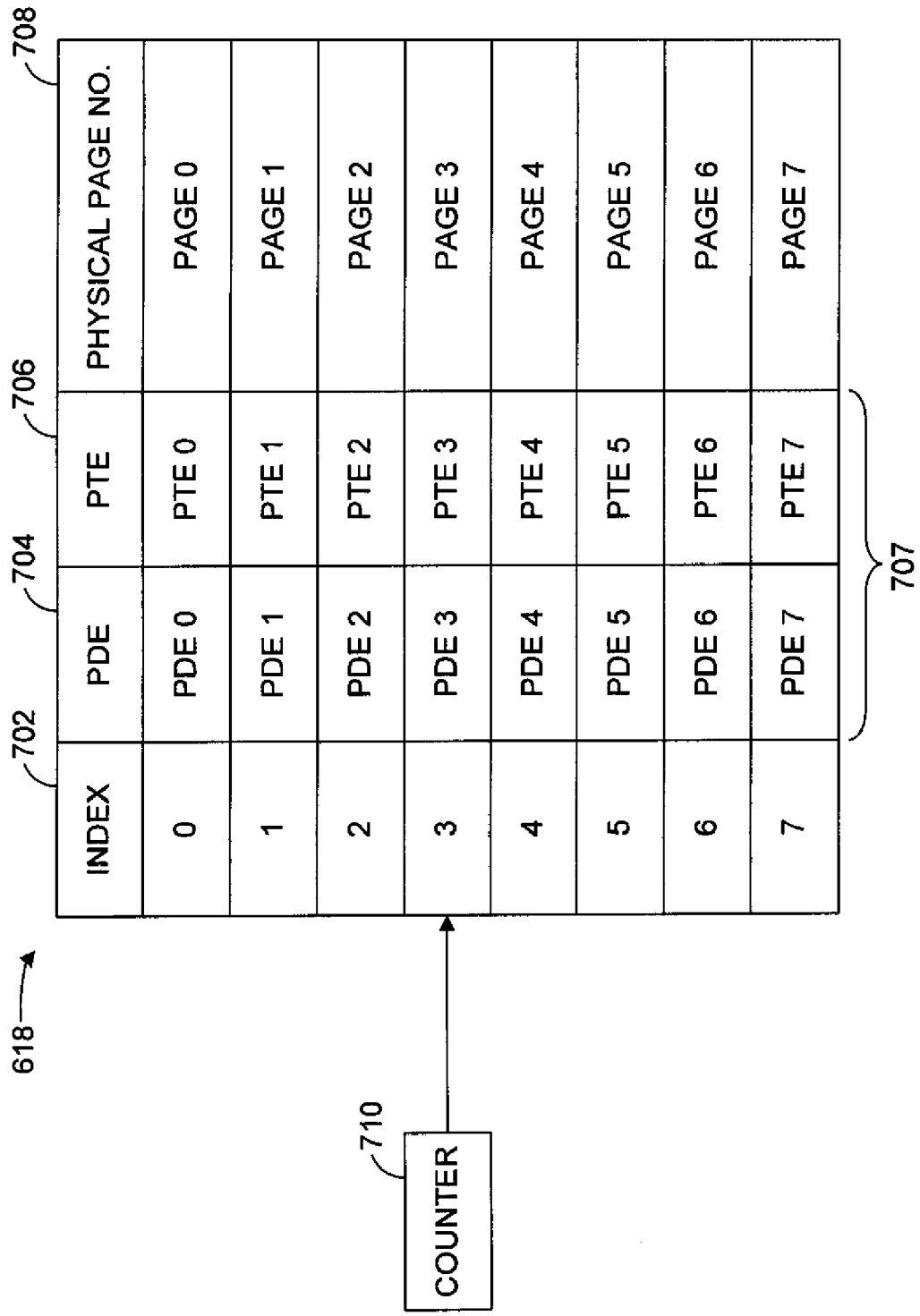
FIG. 8 is a table illustrating the structure and content of a software TLB according to this invention.

The method of FIG. 9 involves the use of the S-TLB 618 shown in FIG. 7. One embodiment of the S-TLB 618 is illustrated in FIG. 8. This embodiment of the S-TLB 618 is designed for use in the VMM 104 for a multiprocessor system based on the x86 architecture. Thus, FIG. 8 is a table that illustrates the structure and content of a data structure that implements the S-TLB 618. The S-TLB 618 may be stored in any form of data storage means accessible to the VMM 104, such as in a primary system RAM, such as in the memory 110, or in registers of a microprocessor, such as the CPUs 102. Each virtual CPU 103 within the VMM 104 has its own S-TLB 618. The S-TLB 618 is preferably accessible by multiple software routines within the VMM 104, possibly including all software routines within the VMM 104. However, the S-TLB 618 is preferably not accessible by software routines outside of the VMM 104. FIG. 8 shows an S-TLB 618, comprising a linear array of eight entries. For each of eight indices 702 in the array, the S-TLB 618 stores a 10-bit page directory entry (PDE) 704, a 10-bit page table entry (PTE) 706 and a 20-bit physical page number 708. The PDE 704 and the PTE 706 combine to form a virtual page number 707. FIG. 8 also shows an S-TLB counter 710 for keeping track of the number of valid entries in the S-TLB 618. The S-TLB 618 for this embodiment includes eight array entries because eight is the largest number of different guest virtual page numbers that can be accessed during the execution of any instruction currently available in the x86 architecture. For other architectures, the number of entries in the S-TLB 618 may vary.

FIG. 9 is a flowchart illustrating a method used by the special handler 613 to interpret a guest instruction. At an initial step 802, the special handler 613 retrieves a guest instruction from guest memory, such as an instruction from the guest OS 106 or from a guest application 108. Next, at a step 804, the special handler 613 decodes the instruction to determine the operands needed to execute the instruction and the operation required by the instruction. At a step 806, the special handler 613 fetches the operands required to execute the guest instruction, which may also require one or more accesses to guest memory. At a step 808, the special handler 613 performs the operation required by the instruction. Next, the special handler 613 implements the results of the guest instruction so that the results are the same, with respect to the VM 622, as would have been obtained from a physical implementation of the virtualized hardware platform. For example, the special handler 613 may write a value resulting from the operation back to a guest memory location. As another alternative, the special handler 613 may create an exception to be handled by the guest OS 106. Depending on the guest instruction, the special handler 613 may also take other actions required to maintain the VM 622, such as updating the page tables that are seen by a hardware MMU 105A or 105B. Steps 802, 804, 806, 808 and 810 basically implement a standard interpreter for use in a VMM. Many such interpreters are well known, and any such interpreter may be used in this invention.

Now a step 811, however, is unique to this invention. After a guest instruction has been interpreted and executed, the S-TLB counter 710 is reset or cleared. The S-TLB counter 710 is a counter stored in memory of the VMM 104 or in a register. The S-TLB counter 710 keeps track of the number of valid entries in the S-TLB 618. The S-TLB counter 710 is incremented by one each time a new entry is added to the S-TLB 618, and the counter 710 is reset after the special handler 613 completes execution of a guest instruction. The operation of the S-TLB counter 710 is described in greater detail below.

Figure 11:
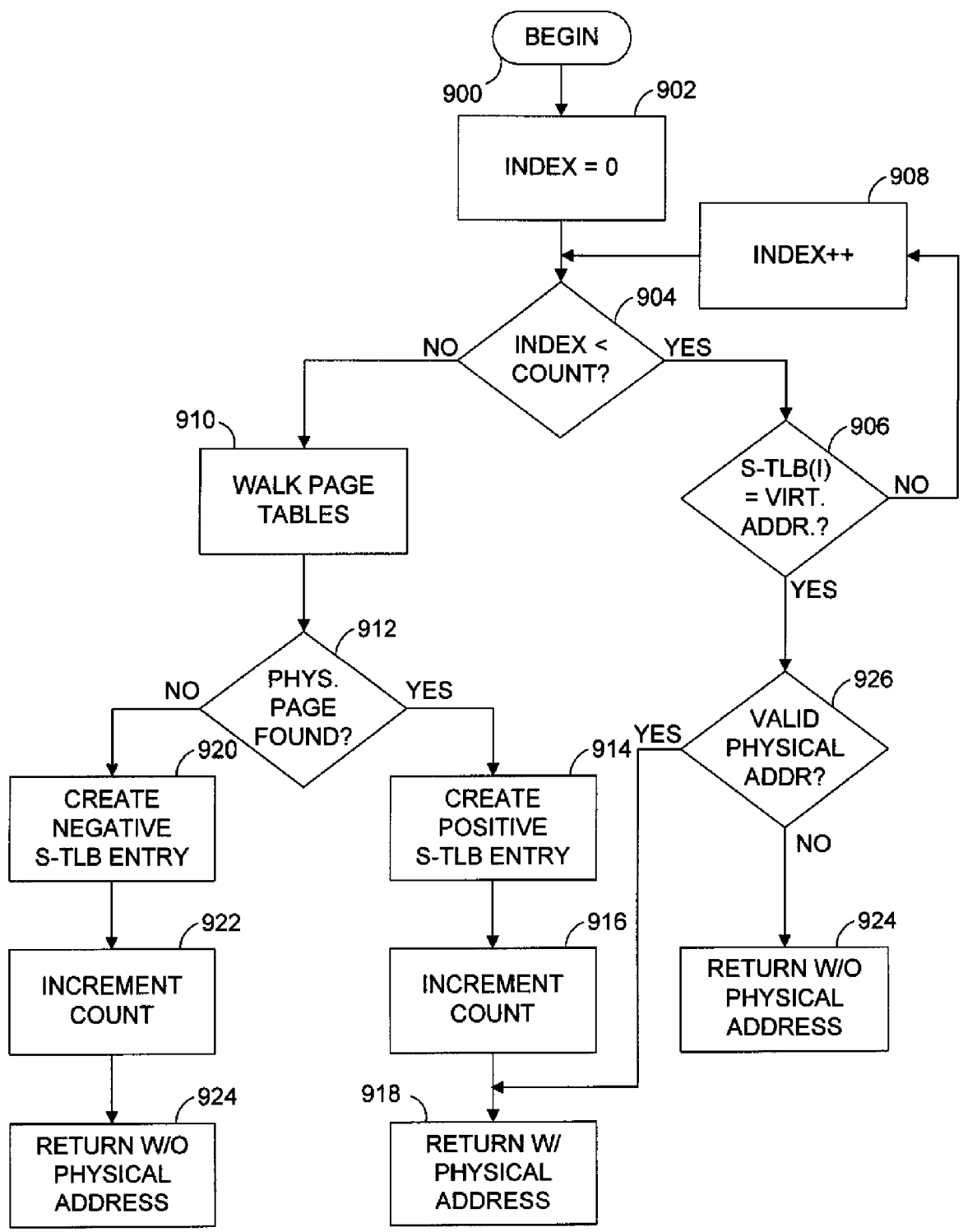
FIG. 11 is a flowchart illustrating a method according to this invention for attempting to access a location within guest memory during the methods of FIGS. 9 and 10.

As described above, the method of FIG. 9 involves one or more guest memory accesses, such as to retrieve the guest instruction, to read operand values and to write back the results. Each of these guest memory accesses requires that a mapping be established between a guest virtual memory address and a physical memory address. These mappings are established according to a method that is illustrated in FIG. 11 and described below. In addition, the special handler 613 may attempt to map guest virtual memory addresses to physical memory addresses for other reasons. For example, if a page fault occurs while the special handler 613 is interpreting a guest instruction, execution within the special handler 613 may switch between various software routines to handle the page fault condition. A separate routine from the one that first discovered the page fault condition may attempt to establish one or more mappings to determine the cause of the page fault. These attempted mappings between guest virtual memory addresses and physical memory addresses will also be performed according to the method of FIG. 11.

The method of FIG. 9 interprets and executes a single guest instruction. This method may be used within a simple loop to create a standard software-based instruction interpreter. Such a loop may be as simple as incrementing an instruction counter after each instruction is interpreted, and fetching guest instructions based on the contents of the instruction counter. In this case, the step 811 would be performed after each instruction is interpreted and executed, within the instruction loop. This adaptation to the process of FIG. 9 would be an implementation of this invention in a software-based instruction interpreter, which is another form of a software-based instruction processor. Such an instruction interpreter could be used in the VMM 104, for example, as an alternative to the BTU 616. Again, any attempt at mapping a guest virtual memory address to a physical memory address would be performed according to the method of FIG. 11.

FIG. 10 is a flowchart illustrating a method used by the translator 615 to translate one or more guest instructions. At an initial step 820, the translator 615 retrieves one or more guest instructions from guest memory, such as from the guest OS 106 or from a guest application 108. Next, at a step 822, the translator 615 decodes the instructions to determine the operands needed to execute the instructions and the operations required by the instructions. The translator 615 produces one or more target instructions that can be executed on the hardware 600, and that will produce the same results as if the guest instructions had been executed on a physical implementation of the virtualized hardware platform. The translator 615 determines the instructions in a manner that will provide firm TLB semantics when the target instructions are executed, as described above. At a step 824, the translator 615 analyzes the target instructions produced during the step 822 and optimizes the set of target instructions to improve performance when the instructions are executed later on. After the target instructions are optimized, they are output to the translation cache 617, at a step 826. Steps 820, 822, 824 and 826 basically implement a standard translator for use in a VMM. Many such translators are well known, and any such translator may be used in this invention. The translation of instructions according to the method of FIG. 10, or according to any other method of translation, is another form of software-based instruction processing.

Now a step 828, however, is unique to this invention. After a set of guest instructions has been translated, the S-TLB counter 710 is reset or cleared, just as was done above during the method of FIG. 9. In this case, the S-TLB counter 710 is reset after one, or possibly more than one, guest instruction is processed, whereas, during the method of FIG. 9, the S-TLB counter 710 is reset after each guest instruction is processed. As described above, the S-TLB 618 of FIG. 8 has a number of entries that is equal to the maximum number of mappings that could be required to interpret and execute a single instruction in the x86 architecture, as it is currently defined. Translating instructions, however, generally requires much fewer mappings than interpreting instructions. When translating an instruction, the translator 615 generally does not need to access the operands of an instruction, so almost all guest memory accesses involved in translating instructions are for instruction fetches.

In one embodiment of the translator 615, the set of instructions that is translated during one pass through the translator 615 is limited such that only one crossing of a page boundary is allowed during instruction fetches. If translating an additional instruction would require a second page boundary crossing, the translation of instructions is halted, the target instructions are output to the translation cache 617, and the instructions in the translation cache 617 are executed. In this embodiment, only one or two entries in the S-TLB 618 are generally used during any pass through the translator 615. Sometimes, however, the translator 615 may peek at an operand of an instruction to improve the optimization of the target code, such as by improving the prediction of possible branches in the target code. In any event, the number of entries in the S-TLB 618 that are required for the interpretation of instructions is generally more than enough for translating instructions.

In the method of FIG. 10, the S-TLB counter 710 is reset only after an entire pass through the translator 615 to improve the translation process. Suppose that the translator 615 is executing on the first CPU 102A to translate a portion of a first guest process. The translator 615 may be fetching instructions from a first page in guest memory for translation. Now suppose the second CPU 102B writes data to the page tables of the first guest process and changes the mapping for the virtual address for the first page. If the S-TLB counter 710 were reset after translating each guest instruction, the next instruction fetched by the first CPU 102A for translation would be from a different physical page, or would result in a failed mapping attempt. Neither of these results is desirable during the translation process. Thus, the guest memory mappings contained in the S-TLB 710 are preferably retained for an entire pass through the translator 615.

As described above, the method of FIG. 10 involves one or more guest memory accesses, such as to retrieve guest instructions, or to peek at selected operand values. Again, each of these guest memory accesses requires that a mapping be established between a guest virtual memory address and a physical memory address. These mappings are also established according to the method of FIG. 11. In addition, the translator 615 may attempt to map guest virtual memory addresses to physical memory addresses for other reasons. For example, the translator 615 may need to establish such a mapping to determine whether or not a translation has already been made for a set of guest instructions, such as when code translations are keyed by physical addresses as well as virtual addresses in the translation cache. These attempted mappings between guest virtual memory addresses and physical memory addresses will also be performed according to the method of FIG. 11.

FIG. 11 illustrates a method that is performed during the methods of FIGS. 9 and 10 to attempt to determine a mapping between a guest virtual memory address that is provided to the method and a physical memory address. The method begins at an initial step 900 and proceeds to a step 902. At the step 902, an index value is set to zero. Next, at a step 904, the method determines whether the index value is less than the value in the S-TLB counter 710. If the index value is not less than the count value, the method proceeds to a step 910; otherwise, the method proceeds to a decision step 906. At the step 906, the method uses the index value as an index into the S-TLB 618. If the virtual page number 707 in the indexed entry matches the virtual page number provided to the method of FIG. 11, the method proceeds to a decision step 926; otherwise, the method proceeds to a step 908. At the step 908, the index value is incremented. Next, the method returns to the decision step 904. The steps 902, 904, 906 and 908 form a loop that steps through each of the valid entries within the S-TLB 618, comparing the virtual page number provided to the method with the virtual page number 707 of each of the valid entries. If a match is found, the method proceeds to the step 926; otherwise, the method proceeds to the step 910. It may be possible in some embodiments of the invention to skip the loop of steps 902, 904, 906 and 908 for a first attempted mapping after the S-TLB 618 has been cleared. If a memory mapping is attempted, and it is known that this is the first attempted mapping since the S-TLB 618 was cleared, then there is no need to execute the loop because there will be no valid entries in the S-TLB 618 to check. In this case, the method may proceed directly to a walk of the page tables at the step 910, without setting the index value to zero and without comparing the index value to the S-TLB counter 710.

At the step 910, the method walks the page tables in a conventional manner, as described above, in an attempt to find a mapping from the provided virtual page number to a corresponding physical page number. Next, at a decision step 912, the method determines whether the page table walk resulted in a physical page number being found or not. If the virtual page is loaded into the memory 110, the method proceeds to a step 914; otherwise, the method proceeds to a step 920. At the step 914, a new entry is created in the S-TLB 618. The virtual page number provided to the method is loaded into the PDE 704 and the PTE 706 of the S-TLB 618, and the physical page number determined in the page table walk is loaded into the physical page number field 708. Next, at a step 916, the S-TLB counter 710 is incremented to reflect the additional valid entry in the S-TLB 618. Next, the method proceeds to a step 918 and returns from the method of FIG. 11 with a valid physical page number.

At the step 920, a new entry is also created in the S-TLB 618. The virtual page number provided to the method is loaded into the PDE 704 and the PTE 706 of the S-TLB 618. However, the physical page number field 708 is loaded with a value that indicates that a physical page number was not found during the page table walk. This value may be any value that will not be interpreted as a valid, accurate physical page number for the attempted guest memory access. For example, the value may be any negative number in most memory systems. As an alternative, the S-TLB 618 could include a separate bit field for each entry in the array, indicating whether the value in the physical page number field 708 represents a valid, accurate physical page number or not. The discussion below assumes an embodiment that uses a negative value in the physical page number field 708 to indicate that a physical page number was not found. Next, at a step 922, the S-TLB counter 710 is incremented to reflect the additional valid entry in the S-TLB 618. Next, the method proceeds to a step 924 and returns from the method of FIG. 11 without a valid physical page number.

At the step 926, the method determines whether the entry within the S-TLB 618, for which the virtual page number field 707 matched the virtual page number provided to the method, has a valid physical page number in the corresponding physical page number field 708. If there is a valid physical page number, the method proceeds to the step 918 and returns from the method of FIG. 11 with the valid physical page number; otherwise, the method proceeds to the step 924 and returns from the method of FIG. 11 without a valid physical page number.

In general then, the method of FIG. 11 steps through each of the valid entries in the S-TLB 618. If a matching virtual page number 707 is not found, the method walks the page tables. If the virtual page is loaded into the memory 110, a new valid entry is made in the S-TLB 618 indicating the corresponding physical page number 708, and the physical page number discovered during the page table walk is returned from the method. If the virtual page is not loaded into the memory 110, a new valid entry is made in the S-TLB 618 with a negative value in the physical page number field 708, and the method returns without a physical page number. If a matching virtual page number 707 is found when stepping through valid entries of the S-TLB 618, the method checks whether the value in the physical page number field 708 is positive or negative. If the value is positive, the physical page number 708 is returned from the method; otherwise, the method returns without a physical page number. As described above, the S-TLB counter 710 is reset by the special handler 613 during the method of FIG. 9 and by the translator 615 during the method of FIG. 10, effectively flushing the contents of the S-TLB 618. The special handler 613 resets the S-TLB counter 710 after interpreting and executing a single instruction, while the translator 615 resets the S-TLB counter 710 after translating one or more guest instructions. One advantage of flushing the S-TLB 618 often is that the S-TLB 618 can be kept very small, which minimizes the time required to search the array.

The method of FIG. 11 is used to attempt to map a guest virtual memory address to a physical memory address during the methods of FIGS. 9 and 10. If the method of FIG. 11 returns a physical page number to the methods of FIGS. 9 and 10 each time the method of FIG. 11 is called, the methods of FIGS. 9 and 10 can complete, as described above. However, consider what happens if the method of FIG. 11 does not return a physical page number. If the method of FIG. 11 does not return a physical page number to the special handler 613 during the method of FIG. 9, then the VMM 104 must indicate a page fault condition to the guest OS 106, just as the real hardware would have done. Advanced VMMs, such as the VMM 104, are typically very complex software programs with many nested layers of code. If the absence of a mapping for a guest virtual page is detected in a deeply nested context, the context must generally be unwound layer by layer, until it is possible to return the page fault to the guest OS 106. While these multiple layers are being unwound, additional guest memory accesses, or at least attempted guest memory mappings, are frequently required or desirable, often by different routines within the VMM 104. The method of FIG. 11 will be used to attempt to find a mapping in each of these cases.

A similar situation may arise during the method of FIG. 10. As shown in the step 820, the translator 615 retrieves one or more guest instructions from guest memory. The number of instructions retrieved depends on the instructions encountered. In one embodiment of the invention, the translator 615 continues retrieving guest instructions until one of the following situations arises: (a) a second page boundary would be crossed upon retrieving the next guest instruction, as described above, (b) a guest instruction cannot be completely translated for some reason, or (c) a pre-defined number of guest instructions are successfully translated. In situations (a) and (c), the code that has been translated is output to the translation cache 617, and execution continues with the code in the translation cache 617. In situation (b), when the translator 615 determines that a guest instruction cannot be completely translated, the translator 615 aborts the translation of that instruction and ends the current translation pass before the instruction that could not be successfully translated. If one or more guest instructions were successfully translated, then the target code that was generated is again output to the translation cache 617, and execution continues with the code in the translation cache 617. If the first instruction encountered during a pass through the translator 615 cannot be completely translated, then a fault is generated and passed back to the guest for processing. If the fault encountered by the translator 615 is a page fault, then the situation is similar to that described above in connection with the method of FIG. 9. The translator 615 must also unwind layer by layer, and additional guest memory mappings may be required during this process as well. Again, the method of FIG. 11 will be used to attempt to find a mapping in each of these cases.

Now return to the example of the first guest instruction to increment the contents of the first memory location. Suppose that the method of FIG. 9 is used to interpret this first instruction, either by the special handler 613 or by a loop instruction interpreter, for example. If the special handler 613 interprets the instruction, the special handler 613 will first attempt to access the first memory location to read the contents into a register. During this guest memory access, the method of FIG. 11 will be used to attempt to find a mapping for the first virtual page. A matching entry will not be found in the S-TLB 618 for the first attempted access to the first virtual page and the page tables will be walked. A mapping to the first physical page will be found in the page tables, a new entry will be added to the S-TLB 618, and the memory access will be completed successfully. Now the second process writes data to the page tables of the first process, overwriting the mapping between the first virtual page and the first physical page. Next, the special handler 613 will increment the contents of the register and will attempt to write the contents of the register back to the first memory location. Again the method of FIG. 11 is used to attempt to determine a mapping for the first virtual page number. This time, however, the method will find a valid entry in the S-TLB 618 containing the first virtual page number and mapping it to the first physical page. Again the memory access will be successful, and execution of the guest instruction will complete successfully. The S-TLB 618 has provided firm TLB semantics for the interpretation of a guest instruction by the special handler 613, just as the hardware TLB 107A provides firm TLB semantics for the direct execution of instructions. Thus, one aspect of this invention is that any guest memory mapping that is required during the software-based processing of an instruction is retained until processing of that instruction has been completed. In the method of FIG. 9, the mapping is cleared after the processing of each instruction, while in the method of FIG. 10, multiple instructions may be processed before the mapping is cleared.

Consider now the scenario described above one more time, but with some modifications. The special handler 613 is again interpreting the first instruction to increment the contents of the first memory location. Suppose, however, that the first virtual page is not loaded into the memory 110. When the special handler 613 attempts to read the contents of the first memory location and load the data into the register, the method of FIG. 11 will be used in this scenario also, to attempt to find a mapping. This time, however, there will be no mapping in either the S-TLB 618 or in the page tables. The method of FIG. 11 will return without a physical page number, and the VMM 104 will issue a page fault. As the VMM 104 is preparing to issue the page fault to the guest OS 106, suppose the second process changes the page tables of the first process to indicate that the first virtual page is loaded into the memory 110. Now if the first instruction were executed on real hardware, execution of the first instruction would be immediately aborted when the MMU 105A determined that there was no mapping for the first virtual page number in the page tables, and a page fault would issue immediately. There would be no additional memory accesses attempted by the processor in connection with that attempted execution of the first instruction. With the VMM 104, however, additional memory accesses and additional attempted memory mappings may be required during the unwinding process, including perhaps an attempt at mapping the first virtual page. During such an attempted mapping of the first virtual page, if the page tables were walked again, a mapping would be found this time. This is another type of intra-instruction inconsistency, with a mapping not being found during one attempted mapping and a mapping being found during a subsequent attempted mapping of the same virtual page number.

Depending on the design of the VMM 104, this intra-instruction inconsistency could create problems within the VMM 104 for various reasons. For example, different modules within the VMM 104 may not be directly linked with one another, and it may be quicker and easier to read various values directly from memory, instead of communicating them between the different modules. Alternatively, as described above, a separate module may attempt one or more mappings to confirm or determine for itself the guest memory address for which a mapping was not found. If one module detects no mapping and a different module detects a mapping, the modules might take conflicting actions. The S-TLB 618 of this invention solves these potential problems as well. In addition to storing positive mappings between a virtual address and a physical address, the S-TLB 618 stores a negative physical address to indicate that a mapping was not found for a virtual address. Detecting this negative physical address in a subsequent memory access avoids the need for a subsequent page table walk, and makes the system less vulnerable to concurrent actions by a different processor. In effect, the S-TLB 618 provides a higher degree of decoupling between the different virtual processors in a multiprocessor VMM, which eases the burden of developing a multiprocessor VMM that accurately exports the multiprocessor system architecture.

During interpretation of a guest instruction, if a page table walk yields no mapping for a virtual page number, a negative entry is created in the S-TLB 618 during the method of FIG. 11. While the VMM 104 is preparing to issue a page fault, if a subsequent access to the same virtual page is necessary, the method of FIG. 11 will be performed again. This time, a valid entry will be found in the S-TLB 618 with a matching virtual page number 707. A negative value in the physical page number field 708 will indicate that there is no mapping for the virtual page. The method of FIG. 11 will return no physical page number, without walking the page tables. The fact that the second process has changed the page tables of the first process during the attempted execution of the first instruction will not adversely affect the operation of the VMM 104. Thus, another aspect of one embodiment of this invention is that, if a guest memory mapping is found not to exist during the processing of an instruction, a notation of this determination will be retained until the processing of the instruction is complete.

The data structure 618 illustrated in FIG. 8 and the methods illustrated in FIGS. 9, 10 and 11 form one implementation of this invention. However, numerous other implementations are also possible, as will be recognized by a person of skill in the art. For example, a linked list may be used instead of an array, or a different method may be used for searching the array for matching virtual page numbers. Also, a separate bit may be used in the data array to indicate whether a mapping was found for the virtual address, instead of entering either a valid or an invalid physical address. In one embodiment of the invention for the x86 architecture, the S-TLB 618 is divided into two structures, one for storing mappings for page directory entries 704 and the other for storing mappings for page table entries 706. This embodiment may be preferred in implementations where one or more software modules within the VMM 612 treat page directory mappings differently from page table mappings.

As described above, in the preferred embodiment of the invention, the S-TLB 618 is used by the special handler 613 when interpreting instructions and by the translator 615 when translating guest instructions into target instructions. The S-TLB 618 is not used when guest instructions are being directly executed or when target instructions are being executed from the translation cache 617. In the VMM implementation of the preferred embodiment, the amount of time during which the special handler 613 or the translator 615 are active is very small in comparison to the amount of time during which guest instructions are being directly executed or target instructions in the translation cache 617 are being executed. In the preferred embodiment, most guest instructions can be either directly executed or translated into target instructions. Only a small number of instructions will need to be interpreted by the special handler 613. Also, many target instructions in the translation cache 617 are executed repeatedly, a very large number of times, without having to be retranslated. So, a relatively small amount of time is spent translating instructions, in comparison to the amount of time spent executing translated instructions. As a result, the proportion of time during which the S-TLB 618 is in use is very small, and the S-TLB 618 will have very little effect on the overall performance of the VMM. Implementing the invention in other VMMs will also generally have very little effect on overall system performance for the same or similar reasons.

As described above, this invention can be implemented in any system involving multiple logical or physical processors and the software-based processing of instructions.

Figure 1:
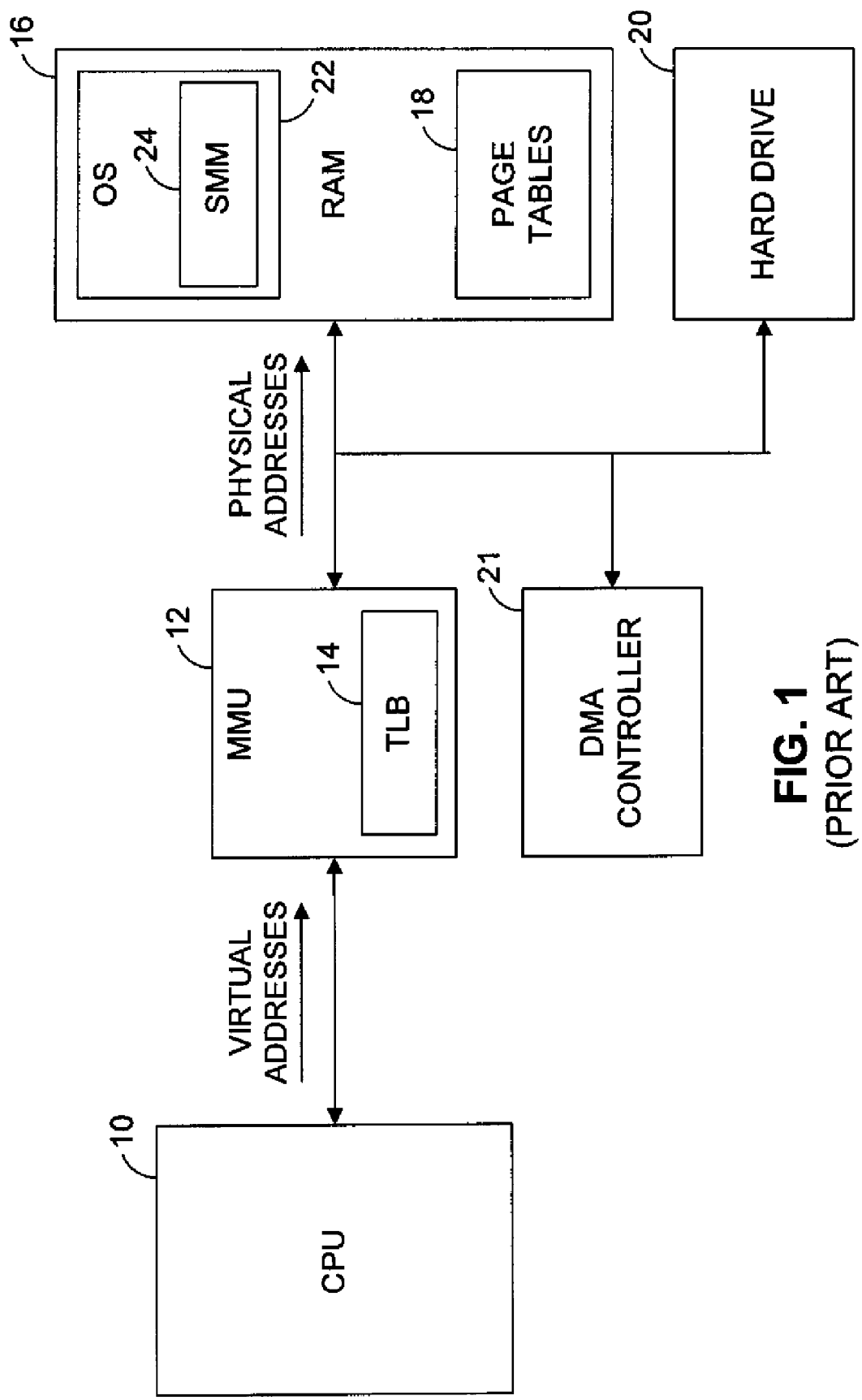
FIG. 1 is a block diagram of the major functional components of a virtual memory system in a general computer system.

The invention may be advantageous, however, in a still broader context. Suppose a VMM is desired for a uniprocessor system, such as the system illustrated in FIG. 1. Note that the system of FIG. 1 includes the DMA controller 21. As is well known in the art, the DMA controller 21 can access the RAM 16 directly. The CPU 10 typically sets up the DMA controller 21 to transfer a block of data between an input/output (I/O) device and the RAM 16. For example, the CPU 10 may set up the DMA controller 21 to transfer a block of data from the hard drive 20 to the RAM 16. Once the CPU 10 has set up the DMA controller 21, the CPU 10 need not have any further involvement with the transfer of data, until the transfer is complete. So, while the DMA controller 21 is transferring the data from the hard drive 20 to the RAM 16, the CPU 10 may continue with other processing. Suppose that the VMM for such a system is performing one of the methods of FIGS. 9 and 10 while the DMA controller 21 is transferring the data. The DMA controller 21 could write to the page tables 18 while the VMM is executing a guest instruction. This could lead to the same intra-instruction inconsistencies as may be seen in a multiprocessing system. The S-TLB of this invention may be implemented in the VMM to guard against such inconsistencies. Thus, this invention also applies to uniprocessor systems that have DMA capabilities, and that involve software-based processing of instructions. In this limited context, the DMA controller 21 may be considered a logical processor. More generally, the invention may be implemented in any computer system that involves the software-based processing of instructions by a processor under a virtual memory system, and the ability of any other component to write data to the memory that contains data of the virtual memory system. In other words, the invention may be implemented in any system that involves the software-based processing of instructions and the concurrent access to shared memory by multiple devices.

What is claimed is:

1. A computer program embodied in a non-transitory, computer-readable medium, the computer program being executable in a physical computer system in which multiple devices have concurrent memory access, the computer program comprising:

a software-based instruction processor for enabling the execution of instructions as if the instructions were executed on a virtualized computer system, the physical computer system having a virtual memory system used by a physical processor in the physical computer system, the processing of each of a plurality of the instructions requiring multiple memory accesses to access code and data related to the instructions, where each of a plurality of the multiple memory accesses requires a memory mapping from a virtual address to a physical address in accordance with the virtual memory system, the virtual memory system comprising a translation lookaside buffer (TLB) and at least one set of one or more page tables used by the physical processor for obtaining memory mappings; and a plurality of mapping-data storage locations, distinct from the TLB and the page tables used by the physical processor for obtaining memory mappings, for storing memory mappings between virtual addresses and physical addresses during the software-based processing of the instructions, wherein, during the processing of each instruction processed by the software-based instruction processor, for each memory access that requires a memory mapping, the instruction processor attempts to establish the required memory mapping by determining whether the mapping-data storage locations contain an entry that matches a virtual address of the required memory mapping and, if the instruction processor finds a matching entry in the mapping-data storage locations, the instruction processor uses a stored memory mapping from the matching entry, instead of using a memory mapping established according to the virtual memory system, and if the instruction processor does not find a matching entry in the mapping-data storage locations, the instruction processor attempts to establish the required memory mapping according to the virtual memory system and, if the required memory mapping is established, adding an entry to the mapping-data storage locations indicating the established memory mapping and retaining the entry until the software-based processing of the instruction is substantially completed, so that, during the software-based processing of instructions, for at least one instruction that requires multiple memory accesses for a virtual address, a memory mapping is found in the page tables of the virtual memory system for a first memory access mapping the virtual address to a physical address, but a memory mapping is found in the mapping-data storage locations for at least one subsequent memory access mapping the virtual address to the same physical address, instead of attempting to establish the required memory mapping according to the page tables of the virtual memory system.

2. A computer program embodied in a non-transitory, computer-readable medium, the computer program being executable in a physical computer system in which multiple devices have concurrent memory access, the computer program comprising:

a software-based instruction processor for enabling the execution of instructions as if the instructions were executed on a virtualized computer system, the physical computer system having a virtual memory system used by a physical processor in the physical computer system, the processing of each of a plurality of the instructions requiring multiple memory accesses to access code and data related to the instructions, where each of a plurality of the multiple memory accesses requires a memory mapping from a virtual address to a physical address in accordance with the virtual memory system; and a plurality of mapping-data storage locations for storing memory mappings between virtual addresses and physical addresses during the software-based processing of the instructions, wherein, during the processing of each instruction processed by the software-based instruction processor, for each memory access that requires a memory mapping, the instruction processor attempts to establish the required memory mapping by determining whether the mapping-data storage locations contain an entry that matches a virtual address of the required memory mapping and, if the instruction processor finds a matching entry in the mapping-data storage locations, the instruction processor uses a stored memory mapping from the matching entry, instead of attempting to establish the required memory mapping according to the virtual memory system, if the instruction processor does not find a matching entry in the mapping-data storage locations, the instruction processor attempts to establish the required memory mapping according to the virtual memory system and, if the required memory mapping is established, adding an entry to the mapping-data storage locations indicating the established memory mapping and retaining the entry until the software-based processing of the instruction is substantially completed, if the instruction processor does not find a matching entry in the mapping-data storage locations and the required memory mapping is not established according to the virtual memory system, adding an entry to the mapping-data storage locations indicating that the required memory mapping was not established for the virtual address and retaining the entry until the processing of the instruction is substantially completed, and if the instruction processor finds a matching entry in the mapping-data storage locations, but the entry indicates that a memory mapping was not established for the virtual address, using no memory mapping instead of attempting to establish the required memory mapping according to the virtual memory system.

3. The computer program of claim 2, wherein the computer program is executable in a multiprocessor computer system.

4. The computer program of claim 2, wherein the software-based instruction processor is an interpreter, which interprets the instructions.

5. The computer program of claim 4, wherein the memory mappings in the mapping-data storage locations are cleared after each of a plurality of instructions is interpreted.

6. The computer program of claim 2, wherein the software-based instruction processor is an instruction translator.

7. The computer program of claim 6, wherein the memory mappings in the mapping-data storage locations are cleared after a group of one or more instructions is translated.

8. The computer program of claim 2, wherein the computer program comprises a virtual machine monitor.

9. The computer program of claim 2, wherein the mapping-data storage locations are contained within a linear data array, with each entry in the array including virtual address information and corresponding physical address information.

10. The computer program of claim 9, wherein the number of entries in the linear data array is eight.

11. The computer program of claim 9 further comprising a counter for counting the number of valid entries within the data array, wherein the counter is incremented each time an entry is added to the data array and the data array is cleared by resetting the counter.

12. A method performed by a software-based instruction processor for determining memory mappings between virtual addresses and physical addresses during a software-based processing of instructions in a physical computer system having a virtual memory system used by a physical processor in the physical computer system, in which multiple devices have concurrent access to virtual memory management data, the method comprising:

during the processing of each instruction processed by the software-based instruction processor:

for a first attempt at establishing a first memory mapping required for the processing of the instruction, the instruction processor attempting to establish the first memory mapping for a first virtual address according to the virtual memory system, the virtual memory system comprising a translation lookaside buffer (TLB) and at least one set of one or more page tables used by the physical processor for obtaining memory mappings;

for each memory mapping required for the processing of the instruction and established according to the virtual memory system, the instruction processor retaining the required and established memory mapping separate from the TLB and the page tables used by the physical processor for obtaining memory mappings until the software-based processing of the instruction has substantially completed; and for a subsequent attempted memory mapping required for the processing of the instruction:

if the instruction processor determines that a stored virtual address for a retained memory mapping matches a second virtual address for the subsequent attempted memory mapping, the instruction processor using the retained memory mapping instead of using a memory mapping for the second virtual address established according to the virtual memory system, and if the instruction processor determines that the second virtual address for the subsequent attempted memory mapping does not match any stored virtual address for retained memory mappings, the instruction processor attempting to establish a new memory mapping for the second virtual address according to the virtual memory system, so that, during the software-based processing of instructions, for at least one instruction that requires multiple memory accesses for a virtual address, a memory mapping is found in the page tables of the virtual memory system for a first memory access mapping the virtual address to a physical address, but a memory mapping is found in the retained memory mappings for at least one subsequent memory access mapping the virtual address to the same physical address, instead of attempting to establish the required memory mapping according to the page tables of the virtual memory system.

13. A method performed by a software-based instruction processor for determining memory mappings between virtual addresses and physical addresses during a software-based processing of instructions in a physical computer system having a virtual memory system used by a physical processor in the physical computer system, in which multiple devices have concurrent access to virtual memory management data, the method comprising:

during the processing of each instruction processed by the software-based instruction processor:

for a first attempt at establishing a first memory mapping required for the processing of the instruction, the instruction processor attempting to establish the first memory mapping for a first virtual address according to the virtual memory system;

for each memory mapping required for the processing of the instruction and established according to the virtual memory system, the instruction processor retaining the required and established memory mapping until the software-based processing of the instruction has substantially completed; and for a subsequent attempted memory mapping required for the processing of the instruction:

if the instruction processor determines that a stored virtual address for a retained memory mapping matches a second virtual address for the subsequent attempted memory mapping, the instruction processor using the retained memory mapping instead of attempting to establish a new memory mapping for the second virtual address according to the virtual memory system, if the instruction processor determines that the second virtual address for the subsequent attempted memory mapping does not match any stored virtual address for retained memory mappings, the instruction processor attempting to establish a new memory mapping for the second virtual address according to the virtual memory system, if a memory mapping is not established when attempting to establish a memory mapping for a third virtual address according to the virtual memory system during the processing of an instruction, retaining information indicating a failure to establish the memory mapping for the third virtual address until the software-based processing of the instruction has completed; and if retained information indicates a failure to establish a memory mapping for a fourth virtual address, using no memory mapping instead of attempting to establish a new memory mapping for the fourth virtual address according to the virtual memory system.

14. The method of claim 13, further comprising establishing a data store for retained memory mappings, which is retained separately from the virtual memory system, which is used by a physical processor in the computer system.

15. The method of claim 13, further comprising a step of invalidating all retained memory mappings upon completion of the software-based processing of each instruction.

16. The method of claim 13, wherein the software-based processing of the instruction comprises interpreting the instruction.

17. The method of claim 13, wherein the multiple devices having concurrent access to virtual memory management data comprise multiple physical processors.

18. The method of claim 13, wherein the multiple devices having concurrent access to virtual memory management data comprise multiple logical processors.

19. A computer program embodied in a non-transitory, computer-readable medium, the computer program being executable in a physical computer system in which multiple devices have concurrent memory access, the physical computer system having a virtual memory system used by a physical processor in the physical computer system, the computer program comprising a software-based instruction processor, the software-based instruction processor performing the following steps:

fetching a guest instruction that is to be executed on a virtualized computer system;

decoding the guest instruction;

accessing data related to the execution of the guest instruction; and processing the guest instruction, the processing of the guest instruction requiring multiple memory accesses to access the data related to the execution of the instruction, where each of a plurality of the multiple memory accesses requires a memory mapping from a virtual address to a physical address in accordance with the virtual memory system, the virtual memory system comprising a translation lookaside buffer (TLB) and at least one set of one or more page tables used by the physical processor for obtaining memory mappings, wherein the instruction processor has access to a plurality of mapping-data storage locations, distinct from the TLB and the page tables used by the physical processor for obtaining memory mappings, used for storing memory mappings between virtual addresses and physical addresses during the software-based processing of instructions, wherein, during the processing of the guest instruction, for each memory access that requires a memory mapping, the instruction processor attempts to establish the required memory mapping by determining whether the mapping-data storage locations contain an entry that matches a virtual address of the required memory mapping and, if the instruction processor finds a matching entry in the mapping-data storage locations, the instruction processor uses a stored memory mapping from the matching entry, instead of using a memory mapping established according to the virtual memory system, and if the instruction processor does not find a matching entry in the mapping-data storage locations, the instruction processor attempts to establish the required memory mapping according to the virtual memory system and, if the required memory mapping is established, adding an entry to the mapping-data storage locations indicating the established memory mapping and retaining the entry until the software-based processing of the instruction is substantially completed, so that, during the software-based processing of instructions, for at least one instruction that requires multiple memory accesses for a virtual address, a memory mapping is found in the page tables of the virtual memory system for a first memory access mapping the virtual address to a physical address, but a memory mapping is found in the mapping-data storage locations for at least one subsequent memory access mapping the virtual address to the same physical address, instead of attempting to establish the required memory mapping according to the page tables of the virtual memory system.

20. A computer program embodied in a non-transitory, computer-readable medium, the computer program being executable in a physical computer system in which multiple devices have concurrent memory access, the physical computer system having a virtual memory system used by a physical processor in the physical computer system, the computer program comprising a software-based instruction processor, the software-based instruction processor performing the following steps:

fetching a guest instruction that is to be executed on a virtualized computer system;

decoding the guest instruction;

accessing data related to the execution of the guest instruction; and processing the guest instruction, the processing of the guest instruction requiring multiple memory accesses to access the data related to the execution of the instruction, where each of a plurality of the multiple memory accesses requires a memory mapping from a virtual address to a physical address in accordance with the virtual memory system, wherein the instruction processor has access to a plurality of mapping-data storage locations used for storing memory mappings between virtual addresses and physical addresses during the software-based processing of instructions, wherein, during the processing of the guest instruction, for each memory access that requires a memory mapping, the instruction processor attempts to establish the required memory mapping by determining whether the mapping-data storage locations contain an entry that matches a virtual address of the required memory mapping and, if the instruction processor finds a matching entry in the mapping-data storage locations, the instruction processor uses a stored memory mapping from the matching entry, instead of attempting to establish the required memory mapping according to the virtual memory system, if the instruction processor does not find a matching entry in the mapping-data storage locations, the instruction processor attempts to establish the required memory mapping according to the virtual memory system and, if the required memory mapping is established, adding an entry to the mapping-data storage locations indicating the established memory mapping and retaining the entry until the software-based processing of the instruction is substantially completed, if the instruction processor does not find a matching entry in the mapping-data storage locations and the required memory mapping is not established according to the virtual memory system, adding an entry to the mapping-data storage locations indicating that the required memory mapping was not established for the virtual address and retaining the entry until the processing of the instruction is substantially completed, and if the instruction processor finds a matching entry in the mapping-data storage locations, but the entry indicates that a memory mapping was not established for the virtual address, using no memory mapping instead of attempting to establish the required memory mapping according to the virtual memory system.

21. The computer program of claim 20, wherein the software-based instruction processor is an interpreter, which interprets guest instructions.

22. The computer program of claim 21, wherein processing the guest instruction comprises:

performing an operation required by the guest instruction; and writing back results of the operation.

23. The computer program of claim 20, wherein the software-based instruction processor is an instruction translator.

24. The computer program of claim 23, wherein the software-based instruction processor further performs the following steps:

translating one or more guest instructions into target code;

optimizing the target code; and outputting the target code to a translation cache.

25. The computer program of claim 20, wherein the computer program comprises a virtual machine monitor.

* * * * *